United States Patent
Zohar et al.

(10) Patent No.: US 7,779,224 B2
(45) Date of Patent: Aug. 17, 2010

(54) DATA STORAGE SYSTEM

(75) Inventors: Ofir Zohar, Alfe-Menashe (IL); Yaron Revah, Tel-Aviv (IL); Haim Helman, Ramat Gan (IL); Dror Cohen, Petach-Tikva (IL); Shemer Schwartz, Herzelia (IL)

(73) Assignee: International Business Machines Corporation, Armonk, NY (US)

( * ) Notice: Subject to any disclaimer, the term of this patent is extended or adjusted under 35 U.S.C. 154(b) by 411 days.

(21) Appl. No.: 11/840,378

(22) Filed: Aug. 17, 2007

(65) Prior Publication Data

US 2007/0283093 A1    Dec. 6, 2007

Related U.S. Application Data

(63) Continuation of application No. 10/808,232, filed on Mar. 24, 2004, now abandoned, which is a continuation-in-part of application No. 10/620,080, filed on Jul. 15, 2003, and a continuation-in-part of application No. 10/620,249, filed on Jul. 15, 2003, now Pat. No. 7,293,156.

(51) Int. Cl.
G06F 12/00 (2006.01)
(52) U.S. Cl. .............................. 711/173; 711/114; 710/9
(58) Field of Classification Search .................. 711/173, 711/114; 710/9
See application file for complete search history.

(56) References Cited

U.S. PATENT DOCUMENTS 5,615,352 A * 3/1997 Jacobson et al. ............ 711/114
5,694,576 A   12/1997 Yamamoto et al.
5,875,481 A    2/1999 Ashton et al.
6,000,010 A * 12/1999 Legg .......................... 711/114
6,317,815 B1  11/2001 Mayer et al.
6,404,528 B1   6/2002 Pfeiffer
6,405,284 B1 *  6/2002 Bridge ....................... 711/114
6,434,666 B1   8/2002 Takahashi et al.

(Continued)

OTHER PUBLICATIONS

D. Karger, et al. Consistent Hashing and Random Trees: Distributed Caching Protocols for Relieving Hot Spots on the World Wide Web. Proceedings of the $29^{th}$ ACM Symposium on Theory of Computing, pp. 654-663. May 1997.

(Continued)

*Primary Examiner*—Christian P Chace
*Assistant Examiner*—Hashem Farrokh
(74) *Attorney, Agent, or Firm*—Griffiths & Seaton PLLC

(57) ABSTRACT

A method for storing data, consisting of distributing a first plurality of groups of logical addresses among one or more storage devices in a storage system, receiving a second plurality of data-sets containing the data to be stored, and assigning each data-set among the plurality of data-sets a random number chosen from a first plurality of different numbers. The method further consists of partitioning each data-set into multiple partitions, so that each partition among the multiple partitions receives a sequential partition number, assigning each partition within each data-set to be stored at a specific group of logical addresses in the storage system in accordance with the sequential partition number of the partition and the random number assigned to the data-set, and storing each partition in the storage system at the assigned specific group of logical addresses.

23 Claims, 15 Drawing Sheets

U.S. PATENT DOCUMENTS

| | | | |
|---|---|---|---|
| 6,453,404 | B1 | 9/2002 | Bereznyi et al. |
| 6,457,102 | B1 | 9/2002 | Lambright et al. |
| 6,490,615 | B1 | 12/2002 | Dias et al. |
| 6,901,480 | B2 * | 5/2005 | Don et al. .................. 711/114 |
| 2002/0099797 | A1 * | 7/2002 | Merrell et al. .............. 709/219 |
| 2003/0005256 | A1 * | 1/2003 | Grossman et al. ........... 711/202 |
| 2003/0221063 | A1 | 11/2003 | Eguchi et al. |

OTHER PUBLICATIONS

H. Tang et al. Differentiated Object Placement and Location for Self-Organizing Storage Clusters. Technical Report 2002-32, UCSB, Nov. 2002.

A. Brinkmann et al. Compact, Adaptive Placement Schemes for Non-Uniform Capacities. Proceedings of the 14$^{th}$ ACM Symposium on Parallel Algorithms and Architectures (SPAA). Aug. 2002.

* cited by examiner

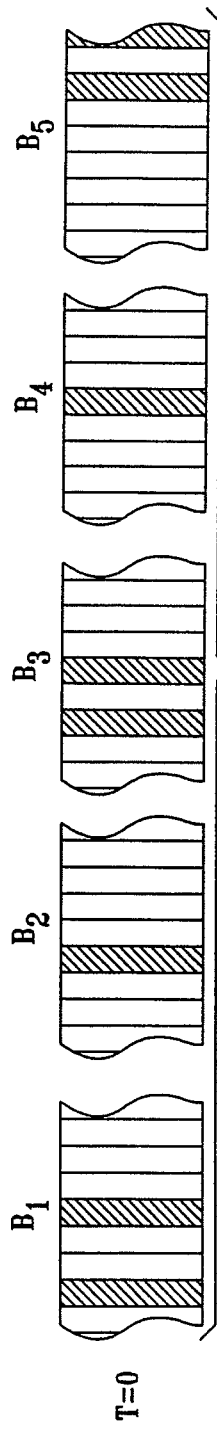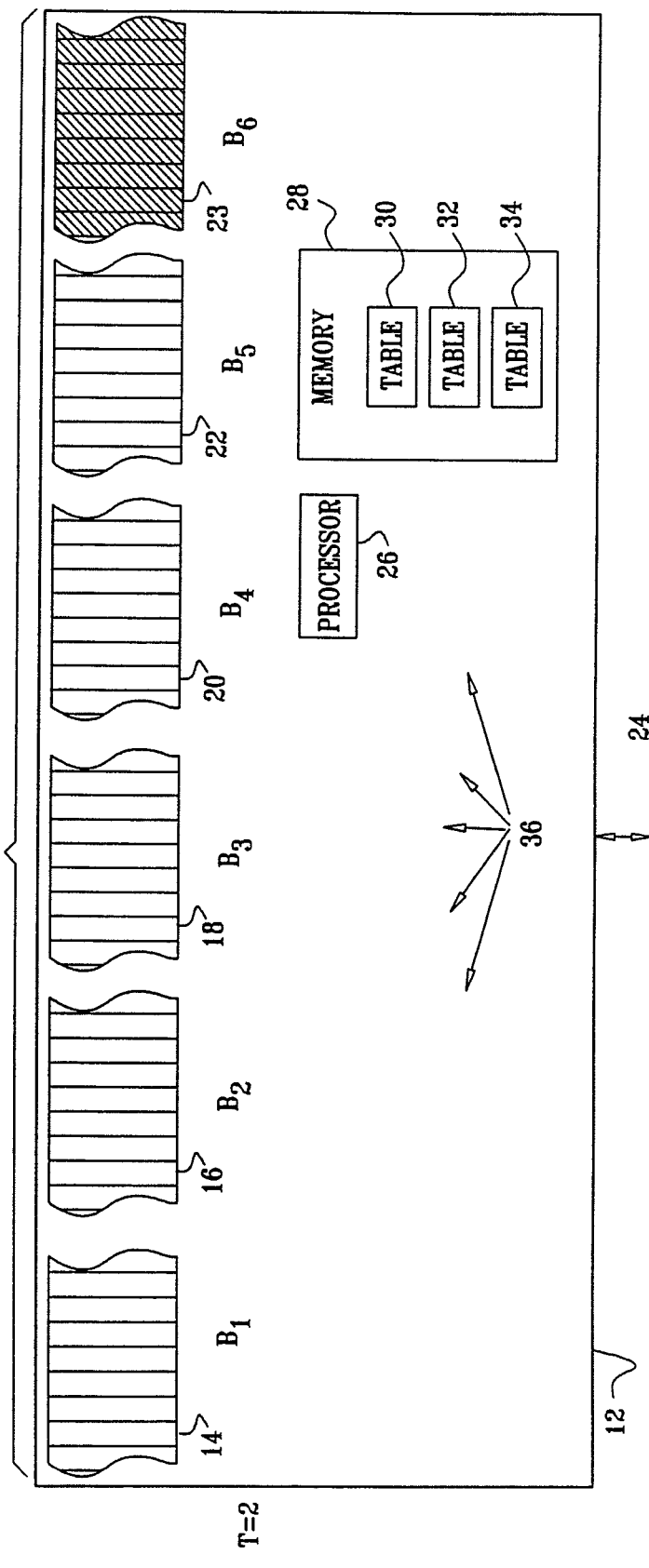
FIG. 5

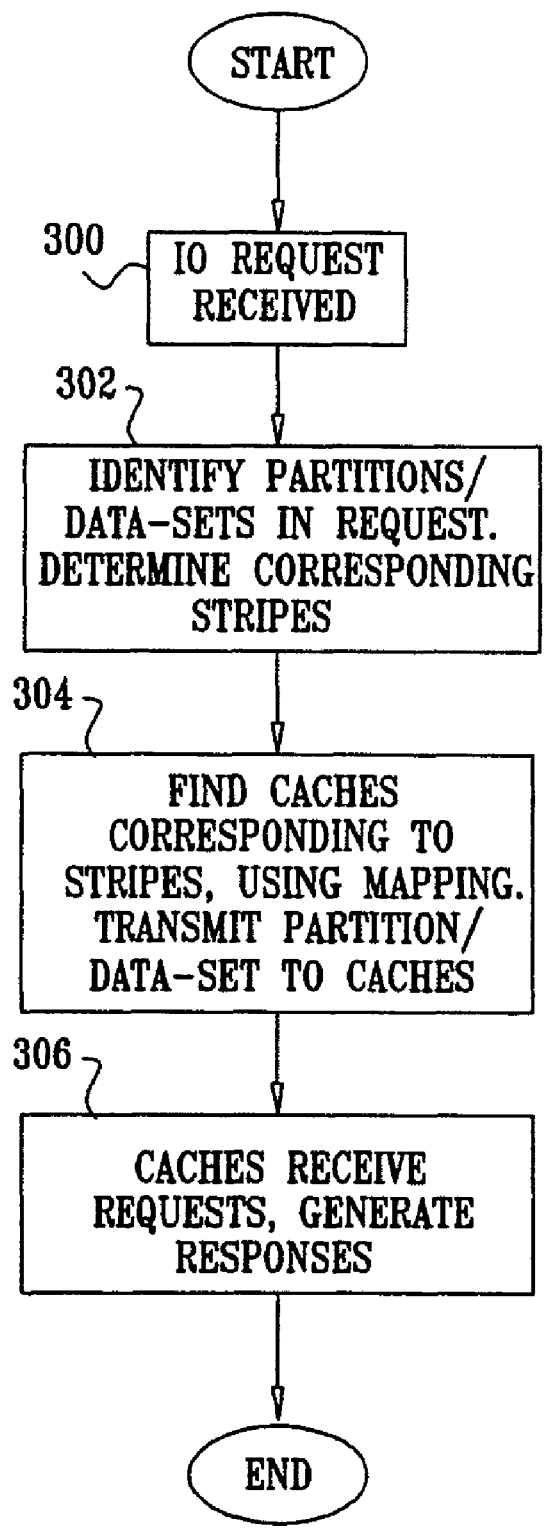

DATA STORAGE SYSTEM

CROSS-REFERENCE TO RELATED APPLICATION

The present application is a continuation of U.S. application Ser. No. 10/808,232 filed on Mar. 24, 2004, now pending, which is a continuation-in-part of U.S. application Ser. No. 10/620,080 and U.S. application Ser. No. 10/620,249, both filed Jul. 15, 2003, the contents of which are herein incorporated by reference.

FIELD OF THE INVENTION

The present invention relates generally to data storage, and specifically to data storage in distributed data storage entities.

BACKGROUND OF THE INVENTION

A distributed data storage system typically comprises cache memories that are coupled to a number of disks wherein the data is permanently stored. The disks may be in the same general location, or be in completely different locations. Similarly, the caches may be localized or distributed. The storage system is normally used by one or more hosts external to the system.

Using more than one cache and more than one disk leads to a number of very practical advantages, such as protection against complete system failure if one of the caches or one of the disks malfunctions. Redundancy may be incorporated into a multiple cache or multiple disk system, so that failure of a cache or a disk in the distributed storage system is not apparent to one of the external hosts, and has little effect on the functioning of the system.

While distribution of the storage elements has undoubted advantages, the fact of the distribution typically leads to increased overhead compared to a local system having a single cache and a single disk. Inter alia, the increased overhead is required to manage the increased number of system components, to equalize or attempt to equalize usage of the components, to maintain redundancy among the components, to operate a backup system in the case of a failure of one of the components, and to manage addition of components to, or removal of components from, the system. A reduction in the required overhead for a distributed storage system is desirable.

An article titled "Consistent Hashing and Random Trees: Distributed Caching Protocols for Relieving Hot Spots on the World Wide Web," by Karger et al., in the *Proceedings of the 29th ACM Symposium on Theory of Computing*, pages 654-663, (May 1997), whose disclosure is incorporated herein by reference, describes caching protocols for relieving "hot spots" in distributed networks. The article describes a hashing technique known as consistent hashing, and the use of a consistent hashing function. Such a function allocates objects to devices so as to spread the objects evenly over the devices, so that there is a minimal redistribution of objects if there is a change in the devices, and so that the allocation is consistent, i.e., is reproducible. The article applies a consistent hashing function to read-only cache systems, i.e., systems where a client may only read data from the cache system, not write data to the system, in order to distribute input/output requests to the systems. A read-only cache system is used in much of the World Wide Web, where a typical user is only able to read from sites on the Web having such a system, not write to such sites.

An article titled "Differentiated Object Placement and Location for Self-Organizing Storage Clusters," by Tang et al., in *Technical Report* 2002-32 of the University of California, Santa Barbara (November, 2002), whose disclosure is incorporated herein by reference, describes a protocol for managing a storage system where components are added or removed from the system. The protocol uses a consistent hashing scheme for placement of small objects in the system. Large objects are placed in the system according to a usage-based policy.

An article titled "Compact, Adaptive Placement Schemes for Non-Uniform Capacities," by Brinkmann et al., in the August, 2002, *Proceedings of the $14^{th}$ ACM Symposium on Parallel Algorithms and Architectures (SPAA)*, whose disclosure is incorporated herein by reference, describes two strategies for distributing objects among a heterogeneous set of servers. Both strategies are based on hashing systems.

U.S. Pat. No. 5,875,481 to Ashton, et al., whose disclosure is incorporated herein by reference, describes a method for dynamic reconfiguration of data storage devices. The method assigns a selected number of the data storage devices as input devices and a selected number of the data storage devices as output devices in a predetermined input/output ratio, so as to improve data transfer efficiency of the storage devices.

U.S. Pat. No. 6,317,815 to Mayer, et al., whose disclosure is incorporated herein by reference, describes a method and apparatus for reformatting a main storage device of a computer system. The main storage device is reformatted by making use of a secondary storage device on which is stored a copy of the data stored on the main device.

U.S. Pat. No. 6,434,666 to Takahashi, et al., whose disclosure is incorporated herein by reference, describes a memory control apparatus. The apparatus is interposed between a central processing unit (processor) and a memory device that stores data. The apparatus has a plurality of cache memories to temporarily store data which is transferred between the processor and the memory device, and a cache memory control unit which selects the cache memory used to store the data being transferred.

U.S. Pat. No. 6,453,404 to Bereznyi, et al., whose disclosure is incorporated herein by reference, describes a cache system that allocates memory for storage of data items by defining a series of small blocks that are uniform in size. The cache system, rather than an operating system, assigns one or more blocks for storage of a data item.

A number of different types of storage system are known in the art. In a storage area network (SAN) data is accessed in blocks at a device level, and the data is transferred in blocks. Typically, the basic unit of data organization is a logical unit (LU) which consists of a sequence of logical block addresses (LBAs).

In a network attached storage (NAS) system, data is accessed as file data or file meta-data (parameters of the file). The basic unit of organization is typically a file.

In an object storage architecture (OSA), the basic unit of storage is a storage object, which comprises file data together with meta-data. The latter comprise storage attributes such as data layout and usage information.

Content addressed storage (CAS) is a particular case of OSA, designed for data that is intended to be stored and not changed. CAS assigns a unique identifier to the stored data, the identifier depending on the contents of the data.

SUMMARY OF THE INVENTION

In embodiments of the present invention, groups of logical addresses are distributed among one or more storage devices comprised in a storage system. Each group of logical addresses is also herein termed a stripe. The storage system receives data to be stored therein in data-sets, and assigns each data-set a random value chosen from a set of different numbers. In some embodiments, each data-set comprises a file or other unit of data created by a file system. The cardinality of the set of different numbers is equal to the number of stripes. The system delineates each data-set into equal-sized partitions, and for each data-set the system assigns each partition of the data-set a sequential partition number.

The system allocates each partition to a specific stripe in accordance with the sequential partition number and the random value of the data-set of the partition, so as to evenly distribute the partitions among the stripes. Each partition is stored to the storage device corresponding to the partition's allocated stripe. This method of allocation ensures substantially even distribution of the partitions among the stripes, regardless of the size of the partitions, of the relative sizes of the partitions and the stripes, and of differences in sizes of the data-sets. The even distribution applies irrespective of the type of data-set, which may, for example, be a file or a data block.

In an embodiment of the present invention, the stripes are sequentially numbered from 1 to s, where s is the number of stripes in the storage system. A set R of different numbers, from which the random value is chosen, comprises all integral values from 0 to s−1. The storage system assigns a random value r∈R to each specific data-set that it receives for storage. Each partition, numbered p, in the specific data-set is allocated for storage in the storage system in the stripe whose number is given by (r+p)modulo(s) if (r+p)modulo(s)≠0, and in the stripe number s if (r+p)modulo(s)=0.

If the storage system comprises more than one storage device, the stripes may be distributed among the storage devices by a procedure that provides a balanced access to the devices. If a storage device is added to or removed from the system, the procedure reallocates the stripes among the new numbers of devices so that the balanced access is maintained. If a device has been added, the procedure only transfers stripes to the added storage device. If a device has been removed, the procedure only transfers stripes from the removed storage device. In both cases, the only transfers of data that occur are of partitions stored at the transferred stripes. The procedure thus minimizes data transfer and associated management overhead when the number of storage devices is changed, or when the device configuration is changed, while maintaining the balanced access.

Typically, the storage devices comprise one or more slow-access-time, mass-storage devices, and the storage system comprises caches, herein also termed interim, fast-access-time caches, coupled to the mass-storage devices. Each cache is assigned a respective range of stripes of the mass-storage devices. The storage system typically comprises one or more interfaces, which receive input/output (IO) requests from host processors directed to specified data-sets and/or partitions of the data-sets. The interfaces convert the IO requests to converted-IO-requests directed to the stripes wherein the data-sets and/or partitions are allocated, and direct all the converted-IO-requests to the caches to which the stripes are assigned.

Each interface translates the IO requests into the converted-IO-requests by means of a mapping stored at the device, the mapping for each interface being substantially the same. Thus, adding or removing a cache from the storage system simply requires updating of the mapping stored in each interface.

The present invention discloses a data allocation approach that can be equally well used for storage area networks, network attached storage systems, or any other kind of storage system. The approach is such that configuration changes can be easily handled with minimal internal data migration for reallocation purposes, while preserving a proper workload balance in the system.

There is therefore provided, according to an embodiment of the present invention, a method for storing data, including:

distributing a first plurality of groups of logical addresses among one or more storage devices;

receiving a second plurality of data-sets containing the data to be stored;

assigning each data-set among the plurality of data-sets a number chosen from a first plurality of different numbers;

partitioning each data-set into multiple partitions, so that each partition among the multiple partitions receives a sequential partition number;

assigning each partition within each data-set to be stored at a specific group of logical addresses in accordance with the sequential partition number of the partition and the random number assigned to the data-set; and storing each partition at the assigned specific group of logical addresses.

The multiple partitions may include equal size partitions.

The data-sets may include data from at least one of a file, file meta-data, a storage object, a data packet, a video tape, a music track, an image, a database record, contents of a logical unit, and an email.

In an embodiment, the first plurality of groups consists of s groups each having a different integral group number between 1 and s, the number consists of an integer r chosen randomly from and including integers between 0 and s−1, the sequential partition number consists of a positive integer p, and the group number of the assigned specific group is (r+p)modulo(s) if (r+p)modulo(s)≠0, and s if (r+p)modulo(s)=0.

The method may be operative in at least one of a storage area network, a network attached storage system, and an object storage architecture.

The number may be chosen by a randomizing function, or alternatively by a consistent hashing function.

There is further provided, according to an embodiment of the present invention, a method for data distribution, including:

receiving at least part of a data-set containing data;

delineating the data into multiple partitions;

distributing logical addresses among an initial set of storage devices so as to provide a balanced access to the devices;

transferring the partitions to the storage devices in accordance with the logical addresses;

adding an additional storage device to the initial set, thus forming an extended set of the storage devices comprising the initial set and the additional storage device; and redistributing the logical addresses among the storage devices in the extended set so as to cause a portion of the logical addresses and the partitions stored thereat to be transferred from the storage devices in the initial set to the additional storage device, while maintaining the balanced access and without requiring a substantial transfer of the logical addresses among the storage devices in the initial set.

The data-set may include data from at least one of a file, file meta-data, a storage object, a data packet, a video tape, a music track, an image, a database record, contents of a logical unit, and an email.

The initial set of storage devices and the additional storage device may be operative in at least one of a storage area network, a network attached storage system, and an object storage architecture.

Distributing the logical addresses may include:
generating a first plurality of sets of logical addresses, and delineating the data may include:
assigning the at least part of the data-set a number chosen from a first plurality of different numbers; and
assigning each partition among the multiple partitions a sequential partition number,
and transferring the partitions may include:
storing each partition at one of the sets of logical addresses in accordance with the sequential partition number of the partition and the number.

There is further provided, according to an embodiment of the present invention, a method for data distribution, including:
receiving at least part of a data-set containing data;
delineating the data into multiple partitions;
distributing logical addresses among an initial set of storage devices so as to provide a balanced access to the devices;
transferring the partitions to the storage devices in accordance with the logical addresses;
removing a surplus storage device from the initial set, thus forming a depleted set of the storage devices comprising the initial set less the surplus storage device; and
redistributing the logical addresses among the storage devices in the depleted set so as to cause the logical addresses of the surplus device and the partitions stored thereat to be transferred to the depleted set, while maintaining the balanced access and without requiring a substantial transfer of the logical addresses among the storage devices in the depleted set.

The data-set may include data from at least one of a file, file meta-data, a storage object, a data packet, a video tape, a music track, an image, a database record, contents of a logical unit, and an email.

The initial set of storage devices may be operative in at least one of a storage area network, a network attached storage system, and an object storage architecture.

Distributing the logical addresses may include:
generating a first plurality of sets of logical addresses, and delineating the data may include:
assigning the at least part of the data-set a number chosen from a first plurality of different numbers; and
assigning each partition among the multiple partitions a sequential partition number,
and transferring the partitions may include:
storing each partition at one of the sets of logical addresses in accordance with the sequential partition number of the partition and the number.

There is further provided, according to an embodiment of the present invention, a data storage system, including:
one or more mass-storage devices, coupled to store partitions of data at respective first ranges of logical addresses (LAs);
a plurality of interim devices, configured to operate independently of one another, each interim device being assigned a respective second range of the LAs and coupled to receive partitions of data from and provide partitions of data to the one or more mass-storage devices having LAs within the respective second range; and
one or more interfaces, which are adapted to receive input/output (IO) requests from host processors, to identify specified partitions of data in response to the IO requests, to convert the IO requests to converted-IO-requests directed to specified LAs in response to the specified partitions of data, and to direct all the converted-IO-requests to the interim device to which the specified LAs are assigned.

At least one of the mass-storage devices may have a slow access time, and at least one of the interim devices may have a fast access time.

The one or more mass-storage devices may be coupled to provide a balanced access to the first ranges of LAs.

The storage system may operate in at least one of a storage area network, a network attached storage system, and an object storage architecture.

There is further provided, according to an embodiment of the present invention, a data storage system, including:
one or more storage devices wherein are distributed a first plurality of groups of logical addresses; and
a processing unit which is adapted to:
receive a second plurality of data-sets containing the data to be stored,
assign each data-set among the plurality of data-sets a number chosen from a first plurality of different numbers,
partition each data-set into multiple partitions, so that each partition among the multiple partitions receives a sequential partition number,
assign each partition within each data-set to be stored at a specific group of logical addresses in the one or more storage devices in accordance with the sequential partition number of the partition and the number assigned to the data-set, and
store each partition in the one or more storage devices at the assigned specific group of logical addresses.

The multiple partitions may include equal size partitions.

The data-sets may include data from at least one of a file, file meta-data, a storage object, a data packet, a video tape, a music track, an image, a database record, contents of a logical unit, and an email.

The first plurality of groups may include s groups each having a different integral group number between 1 and s, the number may include an integer r chosen randomly from and including integers between 0 and s−1, the sequential partition number may include a positive integer p, and the group number of the assigned specific group may be (r+p)modulo(s) if (r+p)modulo(s)≠0, and s if (r+p)modulo(s)=0.

The one or more storage devices and the processing unit may operate in at least one of a storage area network, a network attached storage system, and an object storage architecture.

There is further provided, according to an embodiment of the present invention, data distribution apparatus, including:
an initial set of storage devices among which are distributed logical addresses so as to provide a balanced access to the devices;
an additional storage device to the initial set, thus forming an extended set of the storage devices consisting of the initial set and the additional storage device; and
a processor which is adapted to receive at least part of a data-set containing data, to delineate the data into multiple partitions, to transfer the partitions to the initial set of storage devices in accordance with the logical addresses, to redistribute the logical addresses among the storage devices in the extended set so as to cause a portion of the logical addresses and the partitions stored thereat to be transferred from the storage devices in the initial set to the additional storage device, while maintaining the balanced access and without requiring a substantial transfer of the logical addresses among the storage devices in the initial set.

The data-set may include data from at least one of a file, file meta-data, a storage object, a data packet, a video tape, a music track, an image, a database record, contents of a logical unit, and an email.

The initial set of storage devices and the additional storage device may operate in at least one of a storage area network, a network attached storage system, and an object storage architecture.

The logical addresses may include a plurality of sets of logical addresses, and the processor may be adapted to:

assign the at least part of the data-set a number chosen from a plurality of different numbers, assign each partition among the multiple partitions a sequential partition number, and store each partition at one of the sets of logical addresses in accordance with the sequential partition number of the partition and the number.

There is further provided, according to an embodiment of the present invention, data distribution apparatus, including:

an initial set of storage devices among which are distributed logical addresses so as to provide a balanced access to the devices;

a depleted set of storage devices, formed by subtracting a surplus storage device from the initial set; and a processor which is adapted to receive at least part of a data-set containing data, to delineate the data into multiple partitions, to transfer the partitions to the initial set of storage devices in accordance with the logical addresses, to redistribute the logical addresses and the partitions stored thereat of the surplus storage device among the storage devices in the depleted set while maintaining the balanced access and without requiring a substantial transfer of the logical addresses among the storage devices in the depleted set.

The data-set may include data from at least one of a file, file meta-data, a storage object, a data packet, a video tape, a music track, an image, a database record, contents of a logical unit, and an email.

The initial set of storage devices may be operative in at least one of a storage area network, a network attached storage system, and an object storage architecture.

The logical addresses may include a plurality of sets of logical addresses, and the processor may be adapted to:

assign the at least part of the data-set a number chosen from a plurality of different numbers, assign each partition among the multiple partitions a sequential partition number, and store each partition at one of the sets of logical addresses in accordance with the sequential partition number of the partition and the number.

There is further provided, according to an embodiment of the present invention, a method for storing data, including:

coupling one or more mass-storage devices to store partitions of data at respective first ranges of logical addresses (LAs);

configuring a plurality of interim devices to operate independently of one another;

assigning each interim device a respective second range of the LAs;

coupling each interim device to receive the partitions of data from and provide the partitions of data to the one or more mass-storage devices having LAs within the respective second range;

receiving input/output (IO) requests from host processors;

identifying specified partitions of data in response to the IO requests;

converting the IO requests to converted-IO-requests directed to specified LAs in response to the specified partitions of data; and directing all the converted-IO-requests to the interim device to which the specified LAs are assigned.

At least one of the mass-storage devices may have a slow access time, and at least one of the interim devices may have a fast access time.

The one or more mass-storage devices may be coupled to provide a balanced access to the first ranges of LAs.

The one or more storage devices and the plurality of interim devices may operate in at least one of a storage area network, a network attached storage system, and an object storage architecture.

There is further provided, according to an embodiment of the present invention, a method for data distribution, including:

receiving at least part of a data-set containing data;

delineating the data into multiple equal size partitions;

transferring the partitions to an initial set of storage devices so as to provide a balanced access to the devices;

adding an additional storage device to the initial set, thus forming an extended set of the storage devices comprising the initial set and the additional storage device; and redistributing the partitions among the storage devices in the extended set so as to cause a portion of the partitions to be transferred from the storage devices in the initial set to the additional storage device, while maintaining the balanced access and without requiring a substantial transfer of the partitions among the storage devices in the initial set.

There is further provided, according to an embodiment of the present invention, a method for data distribution, including:

receiving at least part of a data-set containing data;

delineating the data into multiple equal size partitions;

transferring the partitions to an initial set of storage devices so as to provide a balanced access to the devices;

removing a surplus storage device from the initial set, thus forming a depleted set of the storage devices comprising the initial set less the surplus storage device; and redistributing the partitions stored in the surplus device to the depleted set, while maintaining the balanced access and without requiring a substantial transfer of the partitions among the storage devices in the depleted set.

There is further provided, according to an embodiment of the present invention, data distribution apparatus, including:

an initial set of storage devices;

an additional storage device to the initial set, thus forming an extended set of the storage devices comprising the initial set and the additional storage device; and a processor which is adapted to receive at least part of a data-set containing data, to delineate the data into multiple equal size partitions, to transfer the partitions to the initial set of storage devices so as to provide a balanced access to the initial set of storage devices, to redistribute the partitions among the storage devices in the extended set so as to cause a portion the partitions stored in the initial set to be transferred to the additional storage device, while maintaining the balanced access and without requiring a substantial transfer of the partitions among the storage devices in the initial set.

There is further provided, according to an embodiment of the present invention, data distribution apparatus, including:

an initial set of storage devices;

a depleted set of storage devices, formed by subtracting a surplus storage device from the initial set; and a processor which is adapted to receive at least part of a data-set containing data, to delineate the data into multiple equal size partitions, to transfer the partitions to the initial set of storage devices so as to provide a balanced access to the initial set of storage devices, to redistribute the partitions of the surplus storage device among the storage devices in the depleted set while maintaining the balanced access and without requiring a substantial transfer of the partitions among the storage devices in the depleted set.

The present invention will be more fully understood from the following detailed description of the preferred embodiments thereof, taken together with the drawings, a brief description of which is given below.

BRIEF DESCRIPTION OF THE DRAWINGS

FIG. 5 is a schematic diagram illustrating reallocation of addresses when a storage device is added to the devices of FIG. 1, according to an embodiment of the present invention;

FIG. 15 is a flow chart showing steps followed by the system of FIG. 14 on receipt of an input/output request, according to an embodiment of the present invention.

DETAILED DESCRIPTION OF EMBODIMENTS

Figure 1:
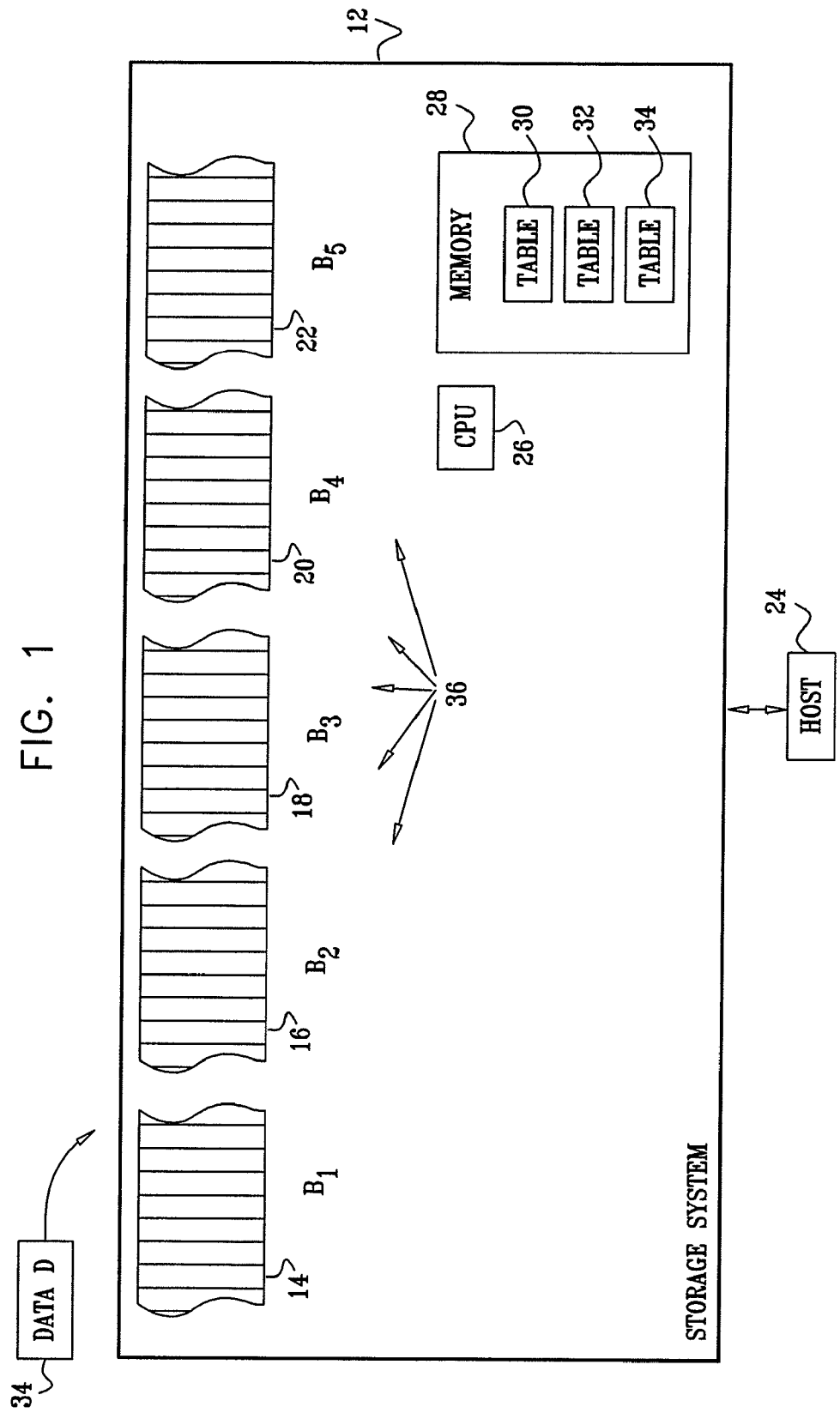
FIG. 1 illustrates distribution of data addresses among data storage devices, according to an embodiment of the present invention.

Reference is now made to FIG. 1, which illustrates distribution of data addresses among data storage devices, according to an embodiment of the present invention. A storage system 12 comprises a plurality of separate storage devices 14, 16, 18, 20, and 22, also respectively referred to herein as storage devices $B_1$, $B_2$, $B_3$, $B_4$, and $B_5$, and collectively as devices $B_n$. It will be understood that system 12 may comprise substantially any number of physically separate devices, and that the five devices $B_n$ used herein are by way of example. Devices $B_n$ comprise any components wherein data 33, also herein termed data D, may be stored, processed, and/or serviced. Examples of devices $B_n$ comprise random access memory (RAM) which has a fast access time and which are typically used as caches, disks which typically have a slow access time, or any combination of such components. A host 24 communicates with system 12 in order to read data from, or write data to, the system. A processor 26 uses a memory 28 to manages system 12 and allocate data D to devices $B_n$. It will be appreciated that processor 26 may comprise one or more processing units, and that some or all of the processing units may be centralized or distributed in substantially any suitable locations, such as within devices $B_n$ and/or host 24. The allocation of data D by processor 26 to devices $B_n$ is described in more detail below.

Data D is processed in devices $B_n$ at logical addresses (LAs) of the devices by being written to the devices from host 24 and/or read from the devices by host 24. At initialization of system 12 processor 26 distributes the LAs of devices $B_n$ among the devices using one of the pre-defined procedures described below. Processor 26 may then store data D at the LAs.

In the description of the procedures hereinbelow, devices $B_n$ are assumed to have substantially equal capacities, where the capacity of a specific device is a function of the device type. For example, for devices that comprise mass data storage devices having slow access times, such as disks, the capacity is typically defined in terms of quantity of data the device may store. For devices that comprise fast access time memories, such as are used in caches, the capacity is typically defined in terms of the quantity of data the device can store, the throughput rate of the device, or both parameters. Those skilled in the art will be able to adapt the procedures when devices $B_n$ have different capacities, in which case ratios of the capacities are typically used to determine the allocations. The procedures allocate groups of one or more LAs to devices $B_n$ so that balanced access to the devices is maintained, where balanced access assumes that taken over approximately 10,000×N transactions with devices $B_n$, the fraction of capacities of devices $B_n$ used are equal to within approximately 1%, where N is the number of devices $B_n$, the values being based on a Bernoulli distribution.

Figure 2:
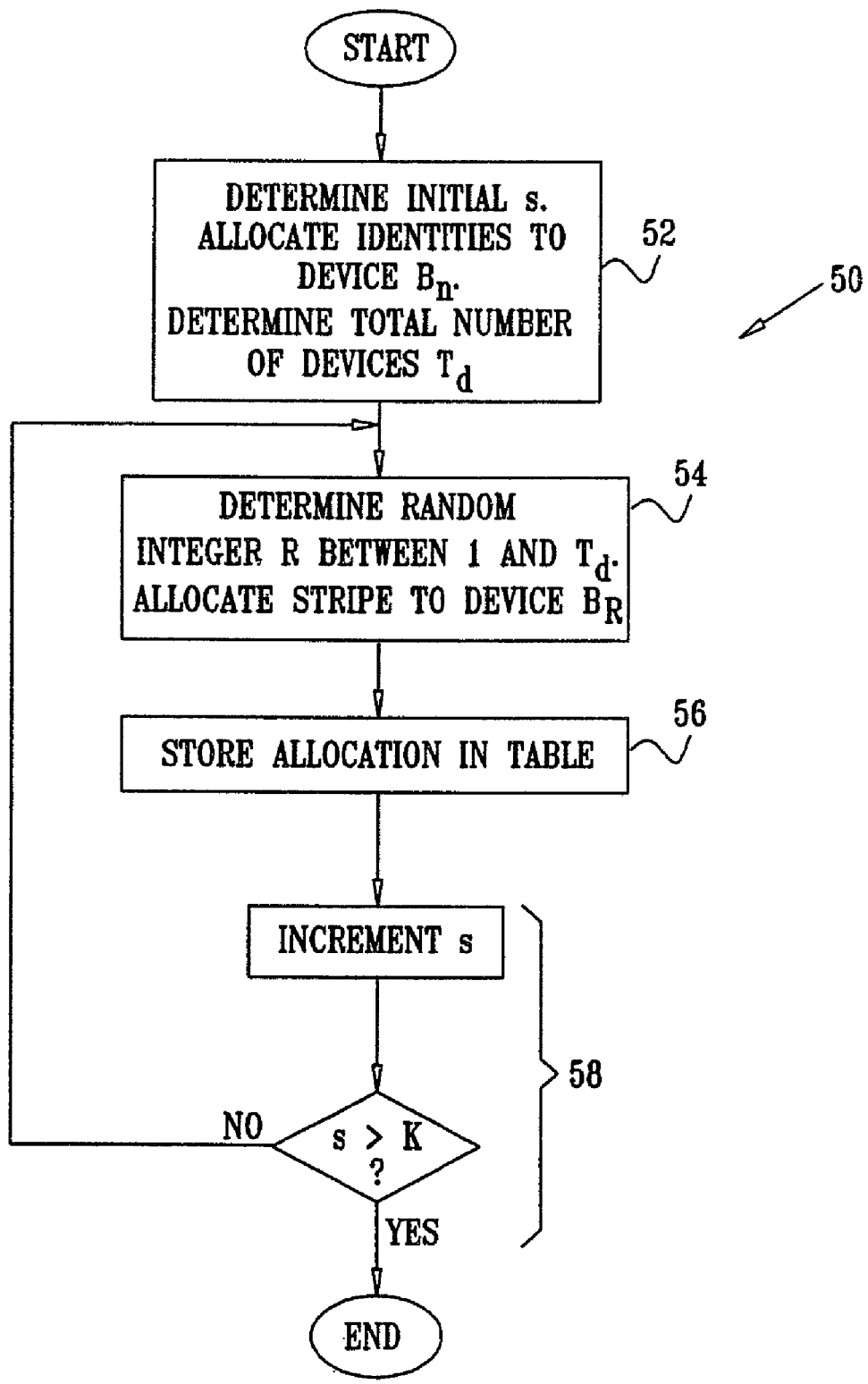
FIG. 2 is a flowchart describing a procedure for allocating addresses to the devices of FIG. 1, according to an embodiment of the present invention.

FIG. 2 is a flowchart describing a procedure 50 for allocating LAs to devices $B_n$, according to an embodiment of the present invention. The LAs are assumed to be grouped into k logical stripes/tracks, hereinbelow termed stripes 36 (FIG. 1), which are numbered 1, . . . , k, where k is a whole number. Each logical stripe comprises one or more consecutive LAs, and all the stripes have the same length. Procedure 50 uses a randomizing function to allocate a stripe s to devices $B_n$ in system 12. The allocations determined by procedure 50 are stored in a table 32 of memory 28.

In an initial step 52, processor 26 determines an initial value of s, the total number $T_d$ of active devices $B_n$ in system 12, and assigns each device $B_n$ a unique integral identity between 1 and $T_d$. In a second step 54, the processor generates a random integer R between 1 and $T_d$, and allocates stripe s to the device $B_n$ corresponding to R. In a third step 56, the allocation determined in step 54 is stored in table 32. Procedure 50 continues, in a step 58, by incrementing the value of s, until all n have been allocated, i.e., until s>k, at which point procedure 50 terminates.

Table I below is an example of an allocation table generated by procedure 50, for system 12, wherein $T_d=5$. The identifying integers for each device $B_n$, as determined by processor 26 in step 52, are assumed to be 1 for $B_1$, 2 for $B_2$, ..., 5 for $B_5$.

TABLE I

| Stripe s | Random Number R | Device $B_s$ |
|---|---|---|
| 1 | 3 | $B_3$ |
| 2 | 5 | $B_5$ |
| ... | ... | ... |
| 6058 | 2 | $B_2$ |
| 6059 | 2 | $B_2$ |
| 6060 | 4 | $B_4$ |
| 6061 | 5 | $B_5$ |
| 6062 | 3 | $B_3$ |
| 6063 | 5 | $B_5$ |
| 6064 | 1 | $B_1$ |
| 6065 | 3 | $B_3$ |
| 6066 | 2 | $B_2$ |
| 6067 | 3 | $B_3$ |
| 6068 | 1 | $B_1$ |
| 6069 | 2 | $B_2$ |
| 6070 | 4 | $B_4$ |
| 6071 | 5 | $B_5$ |
| 6072 | 4 | $B_4$ |
| 6073 | 1 | $B_1$ |
| 6074 | 5 | $B_5$ |
| 6075 | 3 | $B_3$ |
| 6076 | 1 | $B_1$ |
| 6077 | 2 | $B_2$ |
| 6078 | 4 | $B_4$ |
| ... | ... | ... |

Figure 3:
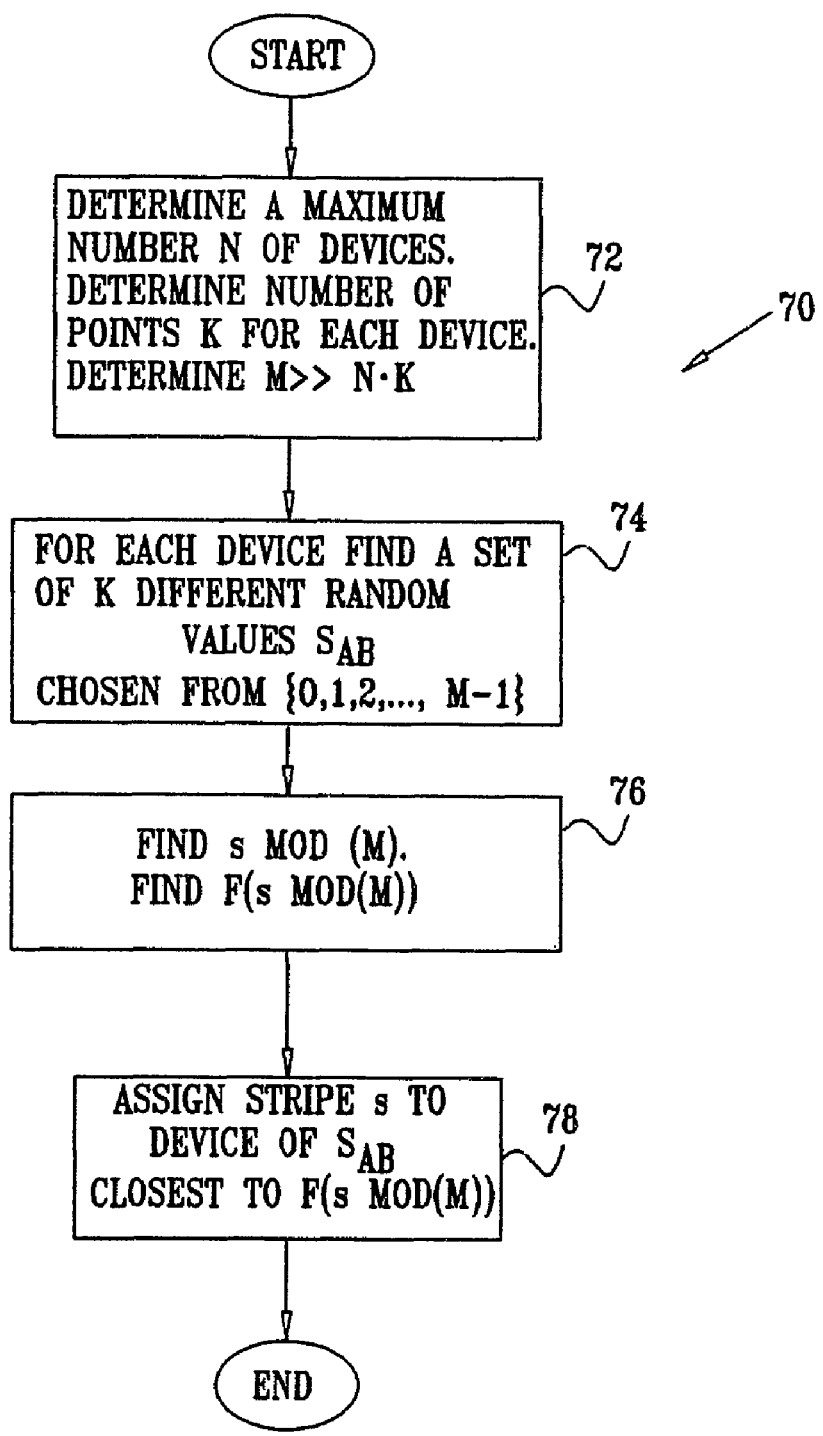
FIG. 3 is a flowchart describing an alternative procedure for allocating addresses to the devices of FIG. 1, according to an embodiment of the present invention.

FIG. 3 is a flowchart showing steps of a procedure 70 using a consistent hashing function to allocate stripes to devices $B_n$, according to an alternative embodiment of the present invention. In an initial step 72, processor 26 determines a maximum number N of devices $B_n$ for system 12, and a number of points k for each device. The processor then determines an integer M, such that M>>N·k.

In a second step 74, processor 26 determines N sets $J_n$ of k random values $S_{ab}$, each set corresponding to a possible device $B_n$, as given by equations (1):

$J_1 = \{S_{11}, S_{12}, \ldots, S_{1k}\}$ for device $B_1$;

$J_2 = \{S_{21}, S_{22}, \ldots, S_{2k}\}$ for device $B_2$;   (1)

...

$J_N = \{S_{N1}, S_{N2}, \ldots, S_{Nk}\}$ for device $B_N$.

Each random value $S_{ab}$ is chosen from $\{0, 1, 2, \ldots, M-1\}$, and the value of each $S_{ab}$ may not repeat, i.e., each value may only appear once in all the sets. The sets of random values are stored in memory 28.

In a third step 76, for each stripe s processor 26 determines a value of s mod(M) and then a value of F(s mod(M)), where F is a permutation function that reassigns the value of s mod(M) so that in a final step 78 consecutive stripes will generally be mapped to different devices $B_n$.

In final step 78, the processor finds, typically using an iterative search process, the random value chosen in step 74 that is closest to F(s mod(M)) Processor 26 then assigns the device $B_n$ of the random value to stripe s, according to equations (1).

It will be appreciated that procedure 70 illustrates one type of consistent hashing function, and that other such functions may be used by system 12 to allocate LAs to devices operating in the system. All such consistent hashing functions are assumed to be comprised within the scope of the present invention.

Procedure 70 may be incorporated into memory 28 of system 12 (FIG. 1), and the procedure operated by processor 26 when allocation of stripes s are required, such as when data is to be read from or written to system 12. Alternatively, a table 30 of the results of applying procedure 70, generally similar to the first and last columns of Table I, may be stored in memory 28, and accessed by processor 26 as required.

Figure 4:
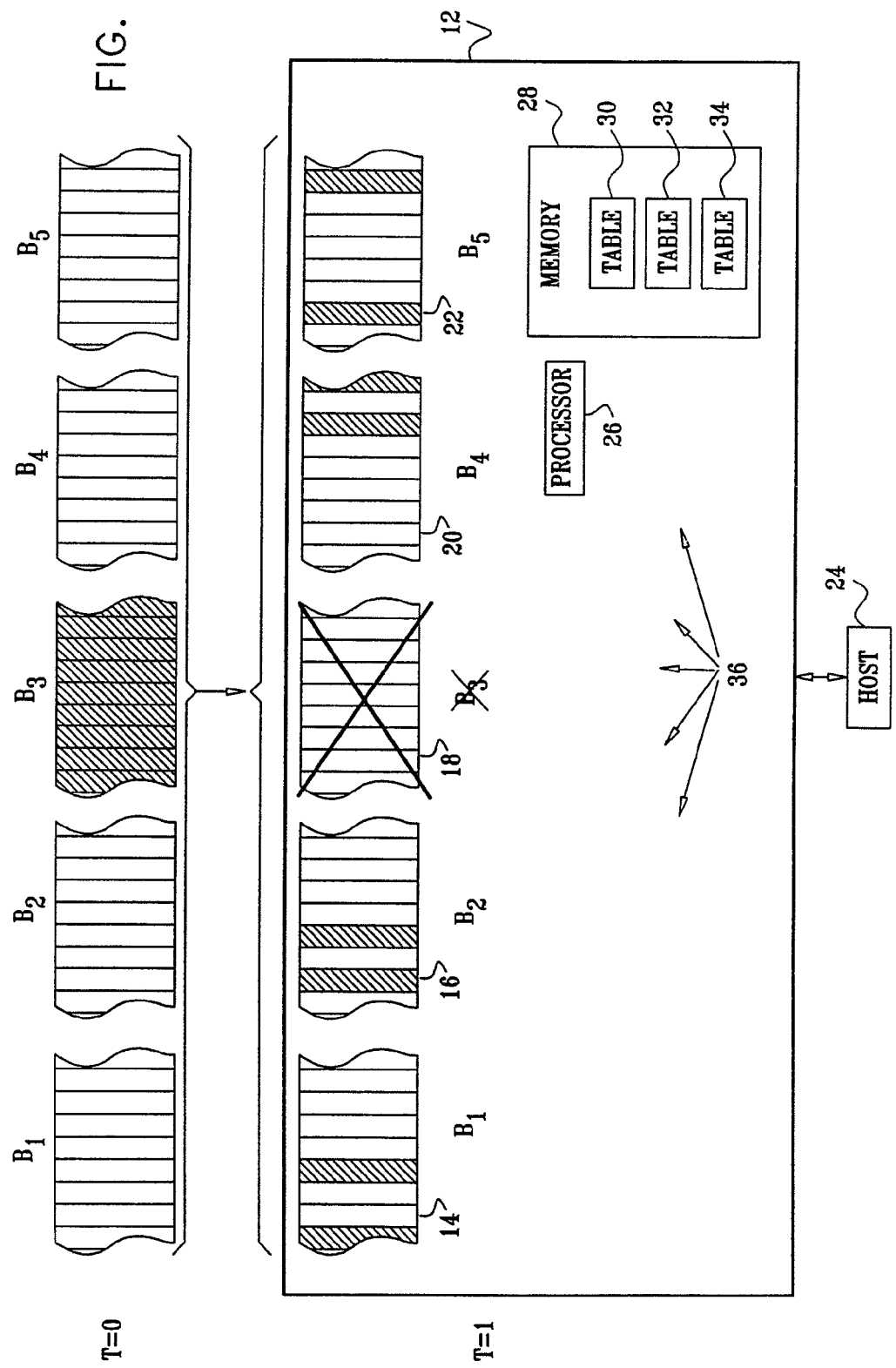
FIG. 4 is a schematic diagram illustrating reallocation of addresses when a storage device is removed from the devices of FIG. 1, according to an embodiment of the present invention.

FIG. 4 is a schematic diagram illustrating reallocation of stripes when a storage device is removed from storage system 12, according to an embodiment of the present invention. By way of example, device $B_3$ is assumed to be no longer active in system 12 at a time t=1, after initialization time t=0, and the stripes initially allocated to the device, and any data stored therein, are reallocated to the depleted set of devices $B_1$, $B_2$, $B_4$, $B_5$ of the system. Device $B_3$ may be no longer active for a number of reasons known in the art, such as device failure, or the device becoming surplus to the system, and such a device is herein termed a surplus device. The reallocation is performed using procedure 50 or procedure 70, typically according to the procedure that was used at time t=0. As is illustrated in FIG. 4, and as is described below, stripes from device $B_3$ are substantially evenly redistributed among devices $B_1$, $B_2$, $B_4$, $B_5$.

If procedure 50 (FIG. 2) is applied at t=1, the procedure is applied to the stripes of device $B_3$, so as to randomly assign the stripes to the remaining active devices of system 12. In this case, at step 52 the total number of active devices $T_d=4$, and identifying integers for each active device $B_n$ are assumed to be 1 for $B_1$, 2 for $B_2$, 4 for $B_4$, 3 for $B_5$ Processor 26 generates a new table, corresponding to the first and last columns of Table II below for the stripes that were allocated to $B_3$ at t=0, an the stripes are reassigned according to the new table. Table II illustrates reallocation of stripes for device $B_3$ (from the allocation shown in Table I).

TABLE II

| Stripe s | Device $B_s$ t = 0 | Random Number R t = 1 | Device $B_s$ t = 1 |
|---|---|---|---|
| 1 | $B_3$ | 1 | $B_1$ |
| 2 | $B_5$ |  | $B_5$ |
| ... | ... | ... | ... |
| 6058 | $B_2$ |  | $B_2$ |
| 6059 | $B_2$ |  | $B_2$ |
| 6060 | $B_4$ |  | $B_4$ |
| 6061 | $B_5$ |  | $B_5$ |
| 6062 | $B_3$ | 3 | $B_5$ |
| 6063 | $B_5$ |  | $B_5$ |
| 6064 | $B_1$ |  | $B_1$ |
| 6065 | $B_3$ | 2 | $B_2$ |
| 6066 | $B_2$ |  | $B_2$ |
| 6067 | $B_3$ | 3 | $B_5$ |
| 6068 | $B_1$ |  | $B_1$ |
| 6069 | $B_2$ |  | $B_2$ |
| 6070 | $B_4$ |  | $B_4$ |
| 6071 | $B_5$ |  | $B_5$ |
| 6072 | $B_4$ |  | $B_4$ |
| 6073 | $B_1$ |  | $B_1$ |
| 6074 | $B_5$ |  | $B_5$ |
| 6075 | $B_3$ | 4 | $B_4$ |
| 6076 | $B_1$ |  | $B_1$ |
| 6077 | $B_2$ |  | $B_2$ |
| 6078 | $B_4$ |  | $B_4$ |
| ... | ... | ... | ... |

It will be appreciated that procedure 50 only generates transfer of stripes from the device that is no longer active in system 12, and that the procedure reallocates the stripes, and any data stored therein, substantially evenly over the remaining active devices of the system. No reallocation of stripes occurs in system 12 other than stripes that were initially allocated to the device that is no longer active. Similarly, no transfer of data occurs other than data that was initially in the device that is no longer active. Also, any such transfer of data may be performed by processor 26 transferring the data directly from the inactive device to the reallocated device, with no intermediate device needing to be used.

Similarly, by consideration of procedure 70 (FIG. 3), it will be appreciated that procedure 70 only generates transfer of stripes, and reallocation of data stored therein, from the device that is no longer active in system 12, i.e., device $B_3$. Procedure 70 reallocates the stripes (and thus their data) from $B_3$ substantially evenly over the remaining devices $B_1$, $B_2$, $B_4$, $B_5$ of the system, no reallocation of stripes or data occurs in system 12 other than stripes/data that were initially in $B_3$, and such data transfer as may be necessary may be performed by direct transfer to the remaining active devices. It will also be understood that if $B_3$ is returned to system 12 at some future time, the allocation of stripes after procedure 70 is implemented is the same as the initial allocation generated by the procedure.

FIG. 5 is a schematic diagram illustrating reallocation of stripes when a storage device is added to storage system 12, according to an embodiment of the present invention. By way of example, a device 23, also herein termed device $B_6$, is assumed to be active in system 12 at time t=2, after initialization time t=0, and some of the stripes initially allocated to an initial set of devices $B_1$, $B_2$, $B_3$, $B_4$, $B_5$, and any data stored therein, are reallocated to device $B_6$. The reallocation is performed using procedure 70 or a modification of procedure 50 (described in more detail below with reference to FIG. 6), typically according to the procedure that was used at time t=0. As is illustrated in FIG. 5, and as is described below, stripes from devices $B_1$, $B_2$, $B_3$, $B_4$, $B_5$ are substantially evenly removed from the devices and are transferred to device $B_6$. $B_1$, $B_2$, $B_3$, $B_4$, $B_5$, $B_6$ act as an extended set of the initial set.

Figure 6:
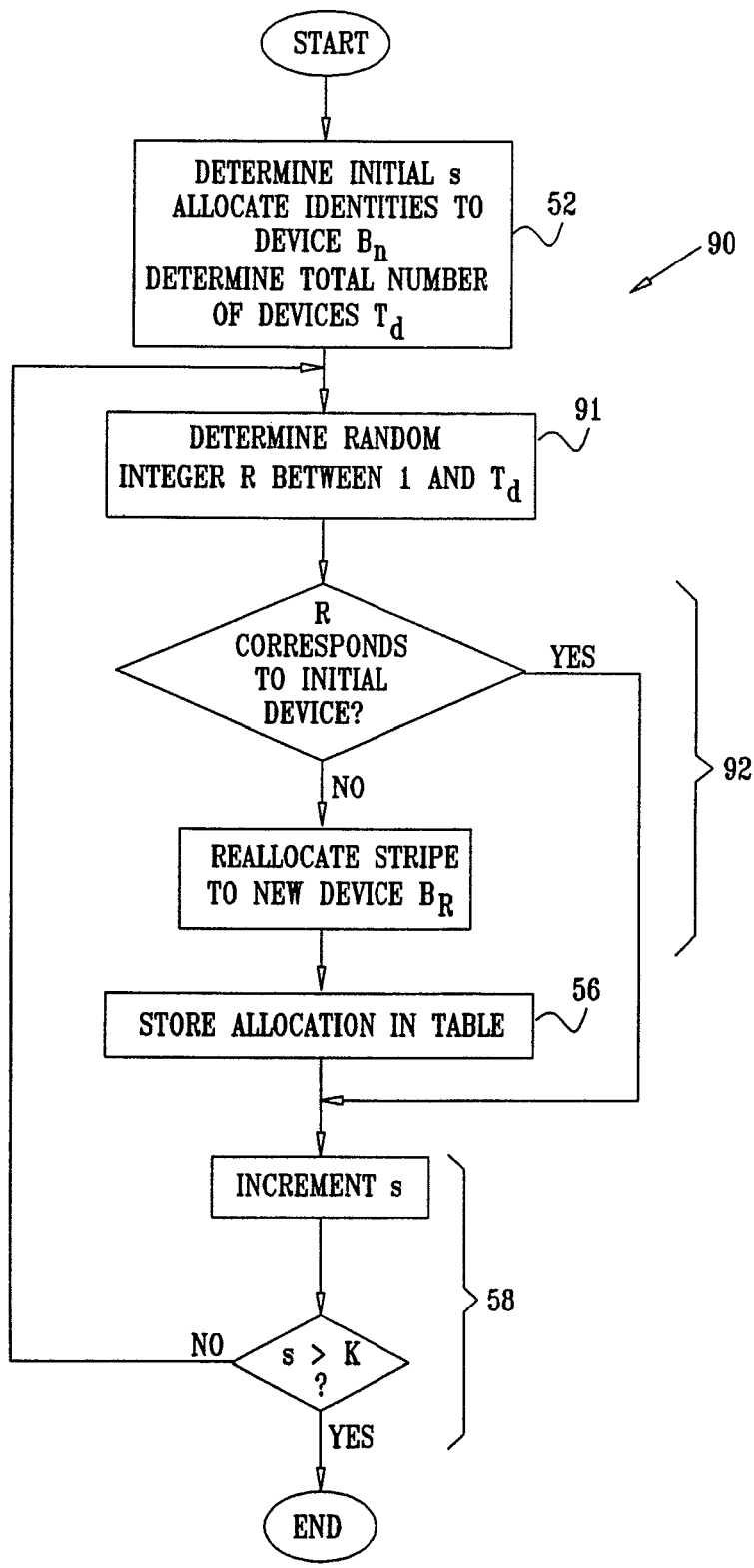
FIG. 6 is a flowchart describing a procedure that is a modification of the procedure of FIG. 2, according to an embodiment of the present invention.

FIG. 6 is a flowchart describing a procedure 90 that is a modification of procedure 50 (FIG. 2), according to an alternative embodiment of the present invention. Apart from the differences described below, procedure 90 is generally similar to procedure 50, so that steps indicated by the same reference numerals in both procedures are generally identical in implementation. As in procedure 50, procedure 90 uses a randomizing function to allocate stripes s to devices $B_n$ in system 12, when a device is added to the system. The allocations determined by procedure 90 are stored in table 32 of memory 28.

Assuming procedure 50 is applied at t=2, at step 52 the total number of active devices $T_d$=6, and identifying integers for each active device $B_n$ are assumed to be 1 for $B_1$, 2 for $B_2$, 3 for $B_3$, 4 for $B_4$, 5 for $B_5$, 6 for $B_6$. In a step 91 processor 26 determines a random integer between 1 and 6.

In a step 92, the processor determines if the random number corresponds to one of the devices present at time t=0. If it does correspond, then processor 26 returns to the beginning of procedure 90 by incrementing stripe s, via step 58, and no reallocation of stripe s is made. If it does not correspond, i.e., the random number is 6, corresponding to device $B_6$, the stripe is reallocated to device $B_6$. In step 56, the reallocated location is stored in table 32. Procedure 90 then continues to step 58. Table III below illustrates the results of applying procedure 90 to the allocation of stripes given in Table II.

TABLE III

| Stripe s | Device $B_s$ t = 0 | Random Number R t = 2 | Device $B_s$ t = 2 |
|---|---|---|---|
| 1 | $B_3$ | 6 | $B_6$ |
| 2 | $B_5$ | 4 | $B_5$ |
| ... | ... | ... | ... |
| 6058 | $B_2$ | 5 | $B_2$ |
| 6059 | $B_2$ | 3 | $B_2$ |
| 6060 | $B_4$ | 5 | $B_4$ |
| 6061 | $B_5$ | 6 | $B_6$ |
| 6062 | $B_3$ | 3 | $B_5$ |
| 6063 | $B_5$ | 1 | $B_5$ |
| 6064 | $B_1$ | 3 | $B_1$ |
| 6065 | $B_3$ | 1 | $B_2$ |
| 6066 | $B_2$ | 6 | $B_6$ |
| 6067 | $B_3$ | 4 | $B_5$ |
| 6068 | $B_1$ | 5 | $B_1$ |
| 6069 | $B_2$ | 2 | $B_2$ |
| 6070 | $B_4$ | 1 | $B_4$ |
| 6071 | $B_5$ | 5 | $B_5$ |
| 6072 | $B_4$ | 2 | $B_4$ |
| 6073 | $B_1$ | 4 | $B_1$ |
| 6074 | $B_5$ | 5 | $B_5$ |
| 6075 | $B_3$ | 1 | $B_4$ |
| 6076 | $B_1$ | 3 | $B_1$ |
| 6077 | $B_2$ | 6 | $B_6$ |
| 6078 | $B_4$ | 1 | $B_4$ |
| ... | ... | ... | ... |

It will be appreciated that procedure 90 only generates transfer of stripes, and thus reallocation of data, to device $B_6$. The procedure reallocates the stripes to $B_6$ by transferring stripes, substantially evenly, from devices $B_1$, $B_2$, $B_3$, $B_4$, $B_5$ of the system, and no transfer of stripes, of data stored therein, occurs in system 12 other than stripes/data transferred to $B_6$. Any such data transfer may be made directly to device $B_6$, without use of an intermediate device $B_n$.

It will also be appreciated that procedure 70 may be applied when device $B_6$ is added to system 12. Consideration of procedure 70 shows that similar results to those of procedure 90 apply, i.e., that there is only reallocation of stripes, and data stored therein, to device $B_6$. As for procedure 90, procedure 70 generates substantially even reallocation of stripes/data from the other devices of the system.

Figure 7:
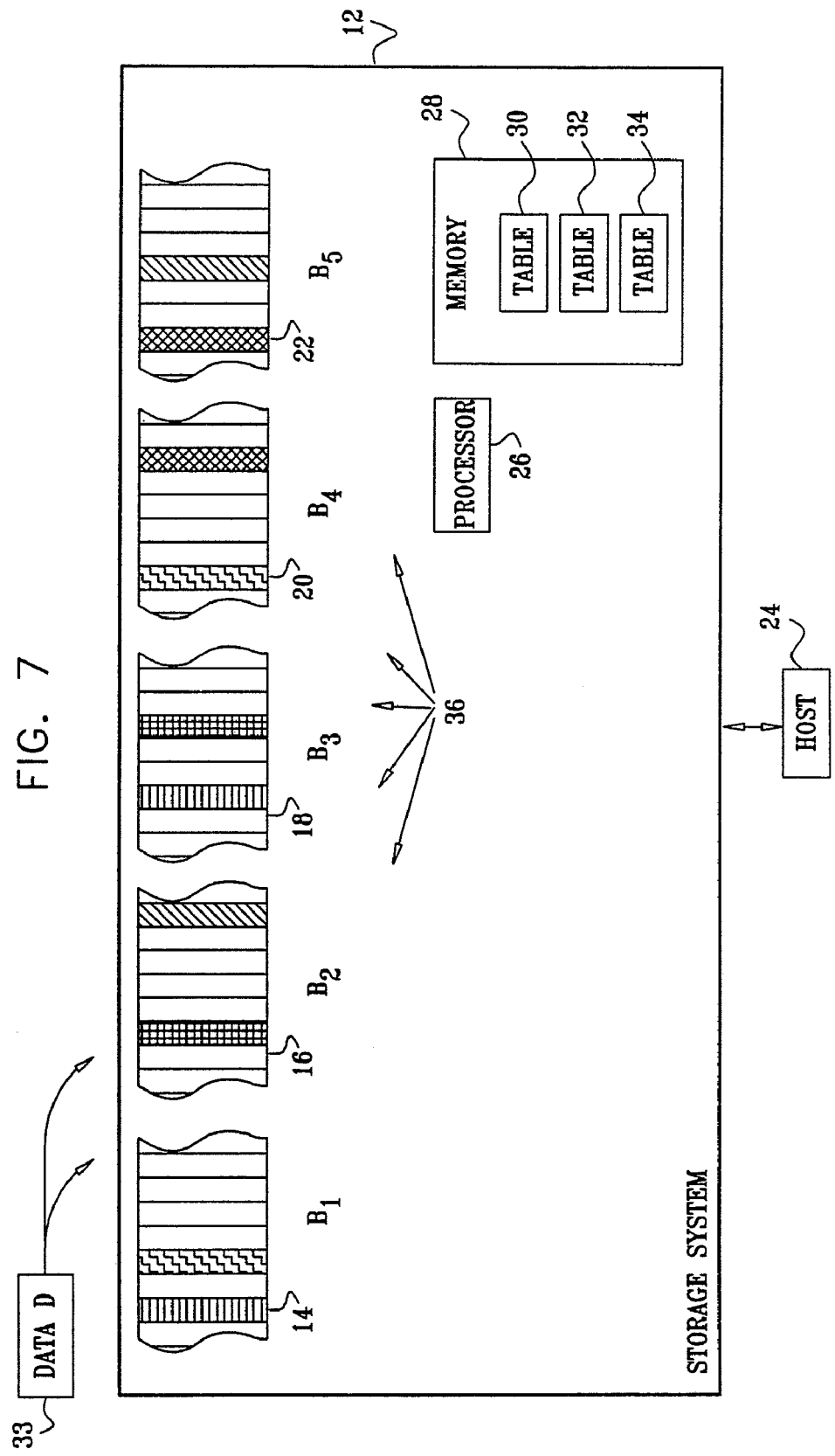
FIG. 7 is a schematic diagram which illustrates a fully mirrored distribution of data for the devices of FIG. 1, according to an embodiment of the present invention.
Figure 8:
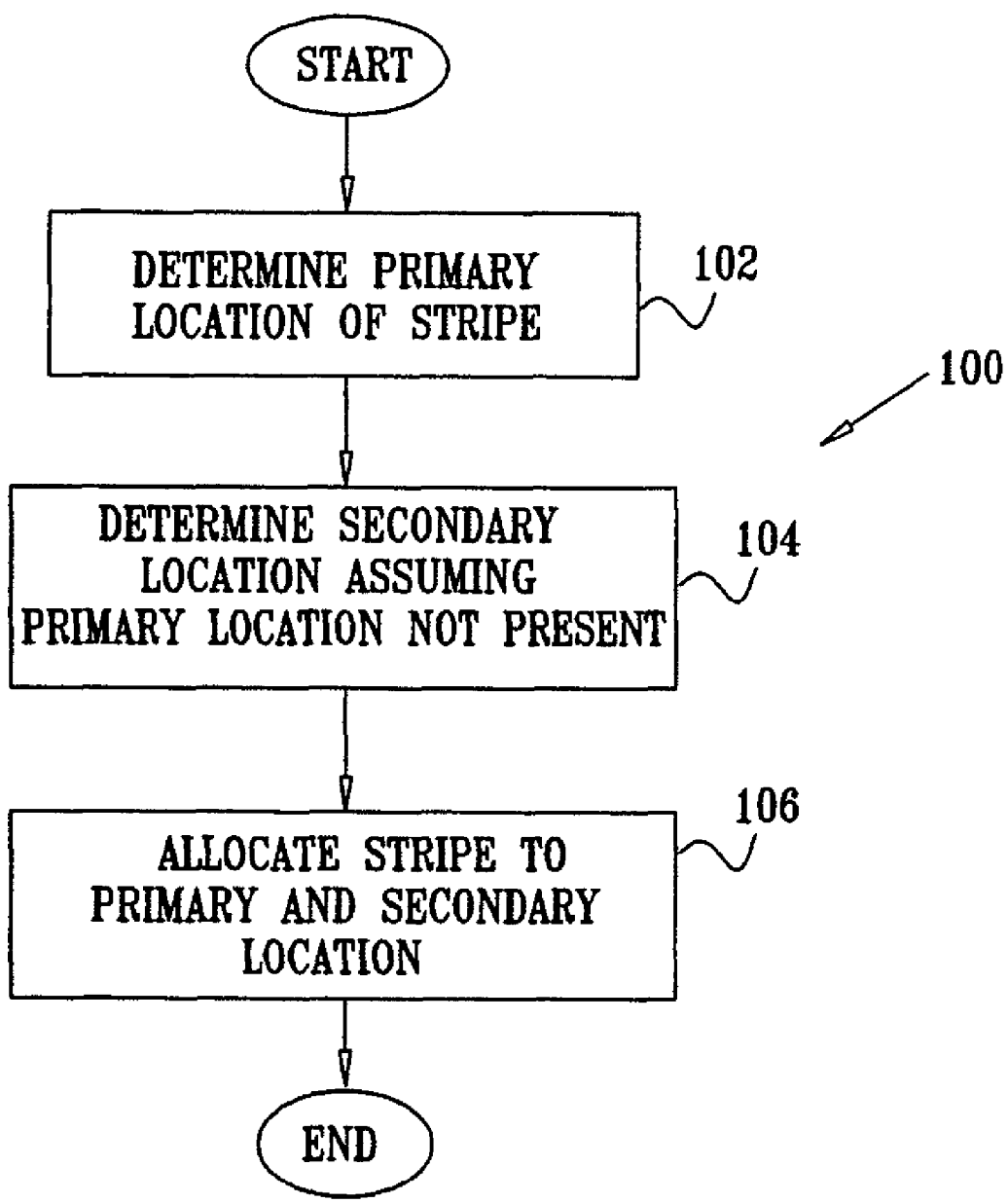
FIG. 8 is a flowchart describing a procedure for performing the distribution of FIG. 7, according to an embodiments of the present invention.

FIG. 7 is a schematic diagram which illustrates a fully mirrored distribution of data D in storage system 12 (FIG. 1), and FIG. 8 is a flowchart illustrating a procedure 100 for performing the distribution, according to embodiments of the present invention. Procedure 100 allocates each specific stripe to a primary device $B_{n1}$, and a copy of the specific stripe to a secondary device $B_{n2}$, n1≠n2, so that each stripe is mirrored. To implement the mirrored distribution, in a first step 102 of procedure 100, processor 26 determines primary device $B_{n1}$ for locating a stripe using procedure 50 or procedure 70. In a second step 104, processor 26 determines secondary device $B_{n2}$ for the stripe using procedure 50 or procedure 70, assuming that device $B_{n1}$ is not available. In a third step 106, processor 26 allocates copies of the stripe to devices $B_{n1}$ and $B_{n2}$, and writes the device identities to a table 34 in memory 28, for future reference. Processor 26 implements procedure 100 for all stripes 36 in devices $B_n$.

Table IV below illustrates devices $B_{n1}$ and $B_{n2}$ determined for stripes 6058-6078 of Table I, where steps 102 and 104 use procedure 50.

TABLE IV

| Stripe | Device $B_{n1}$ | Device $B_{n2}$ |
|---|---|---|
| 6058 | $B_2$ | $B_4$ |
| 6059 | $B_2$ | $B_5$ |
| 6060 | $B_4$ | $B_2$ |
| 6061 | $B_5$ | $B_4$ |
| 6062 | $B_3$ | $B_1$ |
| 6063 | $B_5$ | $B_4$ |
| 6064 | $B_1$ | $B_3$ |
| 6065 | $B_3$ | $B_4$ |
| 6066 | $B_2$ | $B_5$ |
| 6067 | $B_3$ | $B_1$ |
| 6068 | $B_1$ | $B_3$ |
| 6069 | $B_2$ | $B_5$ |
| 6070 | $B_4$ | $B_1$ |
| 6071 | $B_5$ | $B_3$ |
| 6072 | $B_4$ | $B_2$ |
| 6073 | $B_1$ | $B_3$ |
| 6074 | $B_5$ | $B_1$ |
| 6075 | $B_3$ | $B_5$ |
| 6076 | $B_1$ | $B_3$ |
| 6077 | $B_2$ | $B_4$ |
| 6078 | $B_4$ | $B_1$ |

If any specific device $B_n$ becomes unavailable, so that only one copy of the stripes on the device is available in system 12, processor 26 may implement a procedure similar to procedure 100 to generate a new second copy of the stripes that were on the unavailable device. For example, if after allocating stripes 6058-6078 according to Table IV, device $B_3$ becomes unavailable, copies of stripes 6062, 6065, 6067, and 6075, need to be allocated to new devices in system 12 to maintain full mirroring. Procedure 100 may be modified to find the new device of each stripe by assuming that the remaining device, as well as device $B_3$, is unavailable. Thus, for stripe 6062, processor 26 assumes that devices $B_1$ and $B_3$ are unavailable, and determines that instead of device $B_3$ the stripe should be written to device $B_4$. Table V below shows the devices that the modified procedure 100 determines for stripes 6058, 6060, 6062, 6065, 6072, and 6078, when $B_3$ becomes unavailable.

TABLE V

| Stripe s | Device $B_{n1}$ | Device $B_{n2}$ |
|---|---|---|
| 6062 | $B_1$ | $B_2$ |
| 6065 | $B_4$ | $B_5$ |
| 6067 | $B_1$ | $B_4$ |
| 6075 | $B_5$ | $B_2$ |

It will be appreciated that procedure 100 spreads locations for stripes 36 substantially evenly across all devices $B_n$, while ensuring that each pair of copies of any particular stripe are on different devices, as is illustrated in FIG. 7. Furthermore, the even distribution of locations is maintained even when one of devices $B_n$, becomes unavailable. Either copy, or both copies, of any particular stripe may be used when host 24 communicates with system 12. It will also be appreciated that in the event of one of devices $B_n$ becoming unavailable, procedure 100 regenerates secondary locations for copies of stripes 36 that are evenly distributed over devices $B_n$.

Referring back to FIG. 1, it will be understood that the sizes of tables 30, 32, or 34 are a function of the number of stripes in system 12, as well as the number of storage devices in the system. Some embodiments of the present invention reduce the sizes of tables 30, 32, or 34 by duplicating some of the entries of the tables, by relating different stripes mathematically. For example, if system 12 comprises 2,000,000 stripes, the same distribution may apply to every 500,000 stripes, as illustrated in Table VI below. Table VI is derived from Table I.

TABLE VI

| Stripe s | Stripe s | Stripe s | Stripe s | Device $B_s$ |
|---|---|---|---|---|
| 1 | 500,001 | 1,000,001 | 1,500,001 | $B_3$ |
| 2 | 500,002 | 1,000,002 | 1,500,002 | $B_5$ |
| ... | ... | ... | ... | ... |
| 6059 | 506,059 | 1,006,059 | 1,506,059 | $B_2$ |
| 6060 | 506,060 | 1,006,060 | 1,506,060 | $B_4$ |
| ... | ... | ... | ... | ... |

It will be appreciated that procedures such as those described above may be applied substantially independently to different storage devices, or types of devices, of a storage system. For example, a storage system may comprise a distributed fast access cache coupled to a distributed slow access mass storage. Such a storage system is described in more detail in the U.S. Application titled "Distributed Independent Cache Memory," filed on 15 Jul. 2003, and assigned to the assignee of the present invention. The fast access cache may be assigned addresses according to procedure 50 or modifications of procedure 50, while the slow access mass storage may be assigned addresses according to procedure 70 or modifications of procedure 70.

Figure 9:
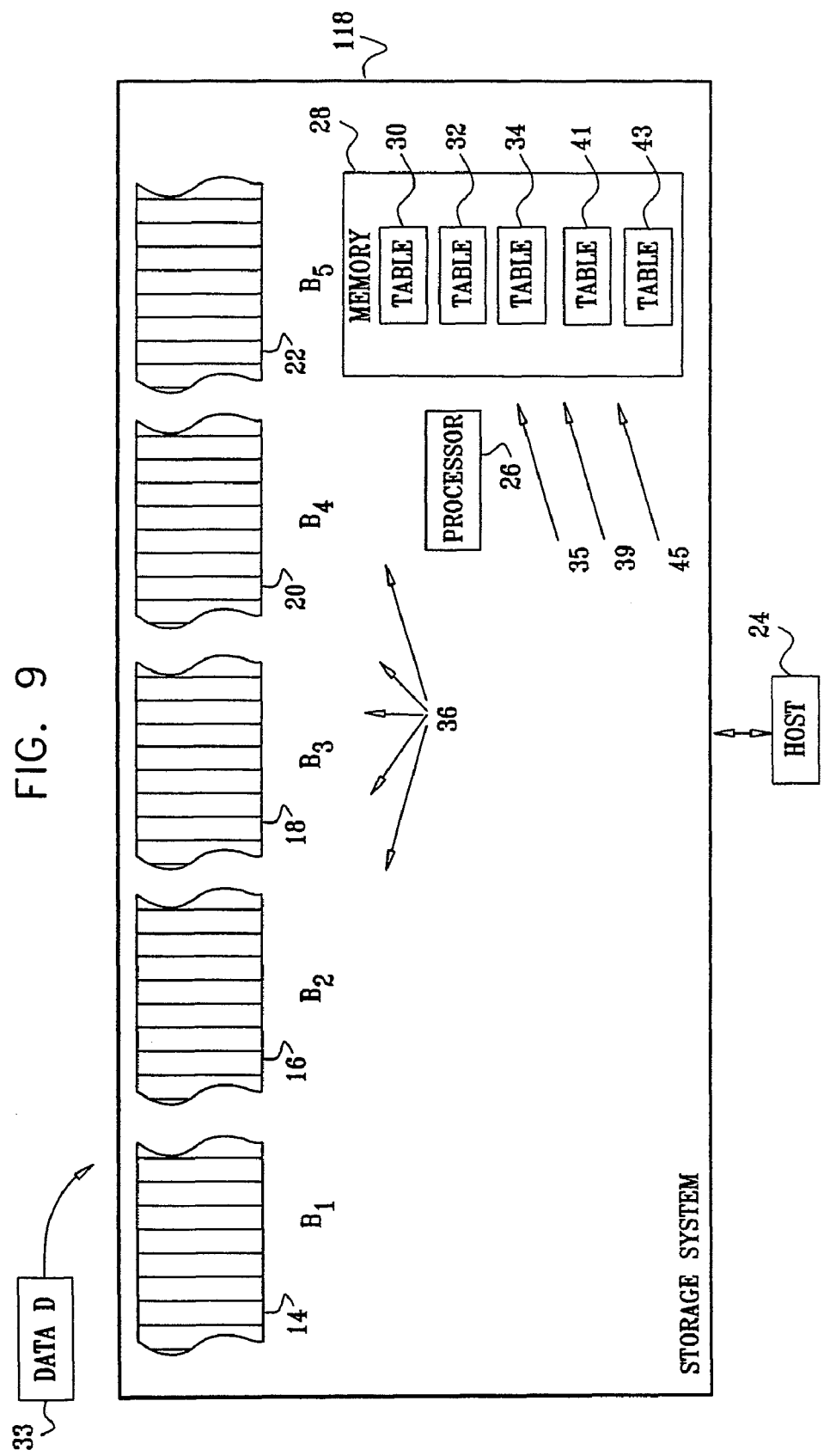
FIG. 9 is a schematic diagram of a storage system, according to an embodiment of the present invention.
Figure 10:
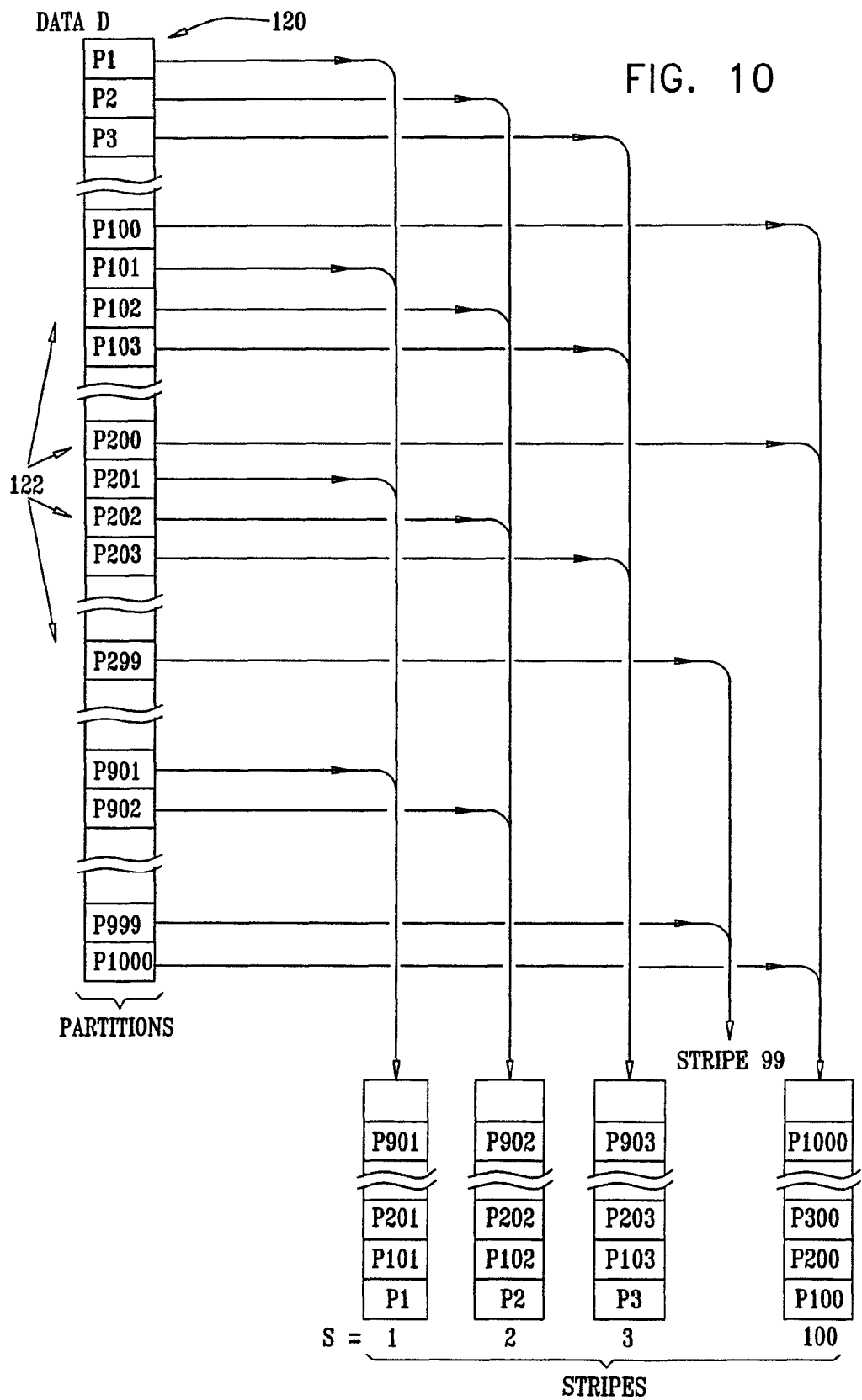
FIG. 10 is a schematic diagram illustrating distribution of data in one or more storage devices of the system of FIG. 9.

FIG. 9 is a schematic diagram of a storage system 118, and FIG. 10 is a schematic diagram illustrating distribution of data D to stripes 36 in one or more storage devices $B_n$ of system 118, according to an embodiment of the present invention. Apart from the differences described below, the operation of system 118 is generally similar to that of system 12 (FIG. 1), such that elements indicated by the same reference numerals in both systems 12 and 118 are generally identical in construction and in operation. In the example described with respect to FIGS. 9 and 10, except where otherwise stated data D is assumed to be one set 120 of data, typically comprising a single file. Data D is delineated, typically by processor 26, into a number of sequential partitions 122, each partition 122 comprising an equal number of bytes. Specific partitions 122 are also referred to herein as P1, P2, ..., and generally as partitions P. By way of example, data D is assumed to comprise 10 Mbytes, which are delineated into 1000 partitions P1, P2, ..., P1000, each partition comprising 10 Kbytes.

Processor 26 allocates partitions P to stripes 36 so that balanced access to the stripes is maintained. Hereinbelow, by way of example there are assumed to be 100 stripes 36, referred to herein as stripes S1, S2, S100, and generally as stripes S, to which partitions P are allocated. Methods by which processor 26 may implement the allocation are described hereinbelow.

In one method of allocation of partitions P, the partitions are allocated to stripes S according to the following equations:

$$Pn \in S(n \cdot \mathrm{mod}(100)), n \cdot \mathrm{mod}(100) \neq 0;$$

$$Pn \in S100, n \cdot \mathrm{mod}(100) = 0; \qquad (2)$$

$$n \in \{1, 2, \ldots, 1000\}$$

As is illustrated in FIG. 10 when data D is 10 Mbytes, equations (2) distribute partitions P substantially evenly over stripes S.

Equations (2) are a specific case of a generalized method for distributing a number p of partitions P over a number s of stripes S. Equations (3) are the corresponding generalization of equations (2):

$$Pn \in S(n \cdot mod(s)), n \cdot mod(s) \neq 0;$$

$$Pn \in Ss, n \cdot mod(s) = 0; \quad (3)$$

$$n \in \{1, 2, \ldots, p\}$$

Applying equations (3) to data D will implement a substantially even distribution for any data D, as long as p>>s. It will be appreciated that if data D comprises more than one set of data, applying equations (3) to each of the sets will distribute the data of all the sets approximately evenly over stripes S, as long as p>>s for every set.

Figure 11:
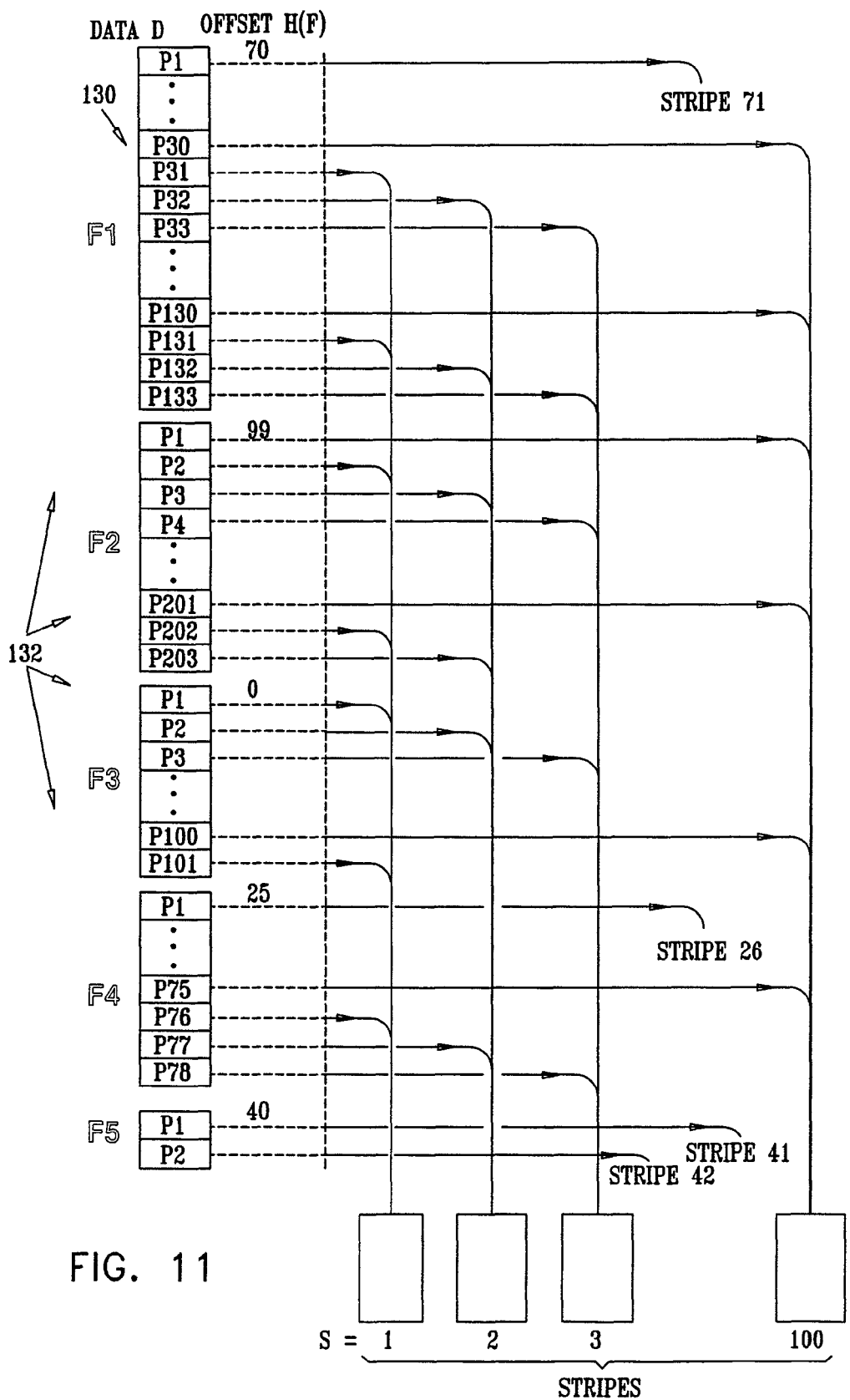
FIG. 11 is a schematic diagram illustrating an alternative method of distribution of data D in the system of FIG. 9, according to an embodiment of the present invention.

FIG. 11 is a schematic diagram illustrating an alternative method of distributing of data D to stripes 36 in one or more storage devices $B_n$ Of system 118, according to an embodiment of the present invention. In the example described with respect to FIG. 11, data D is assumed to comprise a multiplicity of data-sets Ff of data, f={1, 2, ..., m}, each data-set Ff typically comprising one file, although it will be understood that a data-set may comprise substantially any group of data. Processor 26 delineates each data-set Ff into a number of partitions 132, each partition 132 comprising an equal number of bytes. A general expression used herein for a partition of data-set Ff is Pn(Ff), where n is a whole number having a maximum value p. The value of p typically varies from data-set to data-set, and depends on the number of bytes in Ff and the size of the partitions into which data-sets Ff are delineated. Specific partitions 132 are P1(F1), P2(F1), ..., P1(F2), P2(F2), ..., Pn(Ff), ..., P1(Fm), P2(Fm), ... Pp(Fm). Partitions 132 are also referred to generally herein as partitions P.

In order to distribute partitions P between stripes S, processor 26 generates a random positive integral offset H(Ff) for each data-set Ff. The processor may generate H(Ff) by any randomizing process known in the art, such as a hashing function, and sets the value of H(Ff) to be any integer between 0 and (s−1), where s is the number of stripes S. Processor 26 applies the respective offset H(Ff) to each data-set Ff, and allocates each of the partitions of each data-set Ff according to the following equations.

$$Pn(Ff) \in S[(H(Ff)+n) \bmod(s)], [(H(Ff)+n) \bmod(s)] \neq 0;$$

$$Pn(Ff) \in S[s], [(H(Ff)+n) \bmod(s)] = 0; \quad (4)$$

$$n \in \{1, 2, \ldots, p\}, f \in \{1, 2, \ldots, m\}, H(Ff) \in \{0, 1, \ldots, (s-1)\}$$

To illustrate implementation of equations (4), by way of example m is assumed equal to five, so that data D comprises data-sets F1, F2, F3, F4, and F5. The data-sets are assumed to be delineated into partitions of size 10 Kb. The sizes of data-sets F1, F2, F3, F4, and F5 are respectively 1.32 Mb, 2.03 Mb, 1.01 Mb, 780 Kb, and 15 Kb, so that the value of p for each of the data-sets is 132, 203, 101, 78, and 2. The number of stripes, s, into which the partitions are allocated is assumed to be 100.

Processor 26 is assumed to generate the following offsets: H(F1)=70, H(F2)=99, H(F3)=0, H(F4)=25, and H(F5)=40.

Applying equations (4) to determine which stripe partitions are allocated gives:

For data-set F1: P1(F1)∈S71; ...; P30(F1)∈S100; P31(F1)∈S1; P32(F1)∈S2; ...; P130(F1)∈S100; P131(F1)∈S1; P132(F1)∈S2.

For data-set F2: P1(F2)∈S100; P2(F2)∈S1; P3(F2)∈S2; P4(F2)∈S3; ... P201(F2)∈S100; P202(F2)∈S1; P203(F2)∈S2.

For data-set F3: P1(F3)∈S1; P2(F3)∈S2; P3(F3)∈S3; ... P100(F3)∈S100; P101(F3)∈S1.

For data-set F4: P1(F4)∈S26; ... P75(F4)∈S100; P76(F4)∈S1; P77(F4)∈S2; P78(F4)∈S3.

For data-set F5: P1(F5)∈S41; P2(F5)∈S42.

It will be appreciated that in general equations (4) distribute partitions P substantially evenly over stripes S, the distribution being independent of the size of the partitions and of the relation of the number of partitions to the number of stripes. It will also be appreciated that while in the examples above stripes S are sequential, the allocation of the stripes to physical devices $B_n$ typically spreads the individual stripes over devices $B_n$.

Equations (2) or (3) may be implemented by storing one or more procedures 35 (FIG. 9), corresponding to the equations, in memory 28. Equations (4) may be implemented by storing one or more procedures 39 corresponding to the equations in memory 28, together with a table 41 of random integral offsets H(Ff) for each data-set Ff. Alternatively, tables corresponding to the results of procedures 35 and/or 39 may be stored in memory 28. Processor 26 uses the procedures and/or tables when accessing the data, typically for storage and/or retrieval of data, in order to determine the stripe corresponding to a required partition.

Equations (2), (3), and (4) are examples of methods for distributing partitions of data-sets among stripes, using a combination of a random number and a sequential partition number to determine to which stripe a specific partition is allocated, and performing the allocation so that the partitions are evenly distributed among the stripes. The random number is chosen from a set of different numbers, the cardinality of the set being assigned to be equal to the number of stripes. All such methods for distributing partitions evenly among stripes, using a sequential partition number and numbers chosen randomly from a set of different numbers, the set having a cardinality equal to the number of stripes, are assumed to be comprised within the scope of the present invention.

Figure 12:
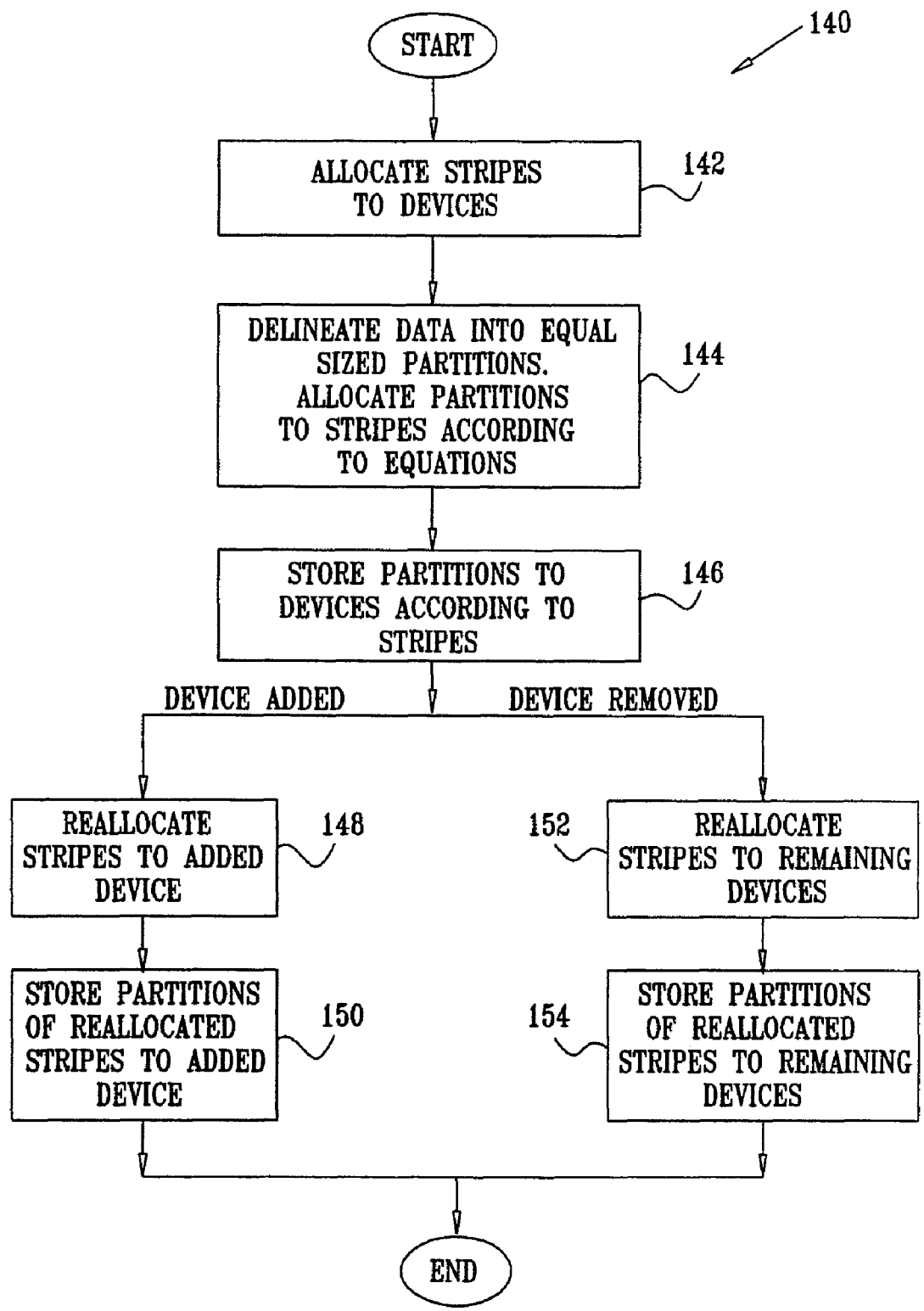
FIG. 12 is a flowchart showing steps performed when data stored in devices of the system of FIG. 9 is redistributed if a device is added to or removed from the system, according to an embodiment of the present invention.

FIG. 12 is a flowchart 140 showing steps performed when data D, stored in devices $B_n$ of system 118, is redistributed if a device is added to the system, or if a device is removed from the system, according to an embodiment of the present invention.

In a first step 142, processor 26 allocates stripes S of devices $B_n$ according to one of the methods described above with respect to FIG. 2, FIG. 3, or FIG. 8.

In a second step 144, the processor delineates data D into equal size partitions. The processor then allocates the partitions to stripes S according to equations (3) or (4), using procedures 35, 39 and/or tables as described above.

In a third step 146, the processor stores the partitions to devices $B_n$ according to the stripes determined in the second step.

If a device is added to system 118, in a fourth step 148, processor 26 reallocates the stripes of existing devices to the added device, as described above with respect to FIG. 5. In a fifth step 150, partitions corresponding to the reallocated stripes are stored to the added device.

If a device is removed from system 118, in a sixth step 152 processor 26 reallocates the stripes of the removed device to the remaining devices, as described above with respect to FIG. 4. In a seventh step 154, partitions corresponding to the reallocated stripes are stored to the remaining devices, in accordance with the reallocated stripes.

After step 150 or 154, the flowchart ends.

The first three steps of flowchart 140 (steps 142, 144, and 146) use two distribution processes to ensure even distribution of data over devices $B_n$. Step 142 distributes the stripes substantially evenly and randomly over the devices, and step 144 distributes the partitions substantially evenly and randomly over the stripes. The process used in step 142 is then typically used if, in steps 148 or 152, a device is added or removed, the process ensuring that the least amount of data transfer occurs because of the addition or removal.

Some embodiments of the present invention store data D using one randomizing process. An example of such a process is described with respect to FIG. 13 below.

Figure 13:
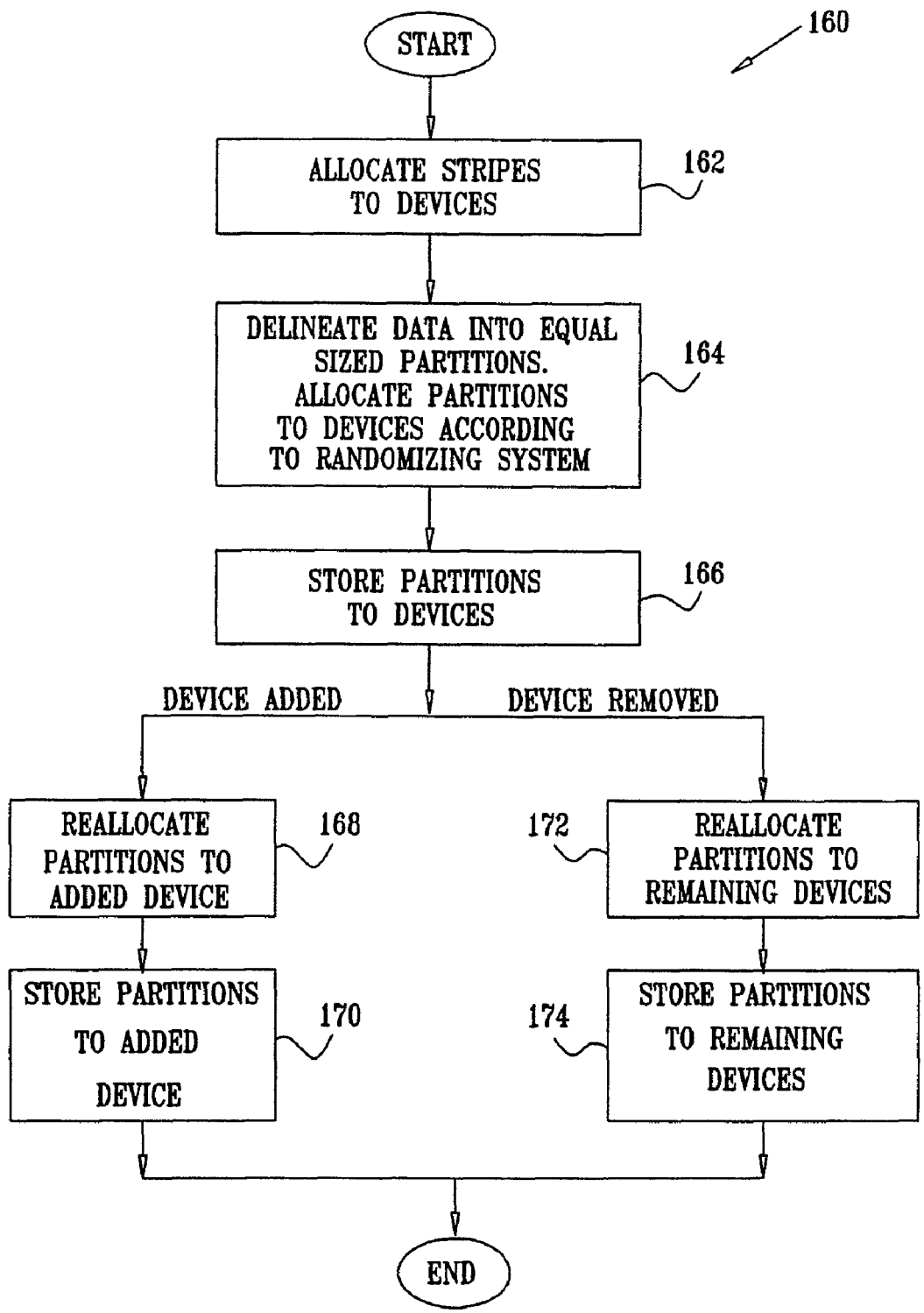
FIG. 13 is a flowchart showing steps performed when data stored in devices of the system of FIG. 9 is redistributed if a device is added to or removed from the system, according to an alternative embodiment of the present invention.

FIG. 13 is a flowchart 160 showing steps performed when data D, stored in devices $B_n$ of system 118, is redistributed if a device is added to the system, or if a device is removed from the system, according to an alternative embodiment of the present invention. Data D may be in the form of one or more data-sets, as exemplified by FIGS. 10 and 11.

In a first step 162, processor 26 allocates stripes S of devices $B_n$ according to any convenient manner, typically a non-random manner. For example, if five devices $B_n$ comprise 100 stripes, device $B_1$ is allocated stripes 1 to 20, device $B_2$ is allocated stripes 21 to 40, . . . , device $B_5$ is allocated stripes 81 to 100.

In a second step 164, processor 26 delineates data D into equal size partitions. The processor then allocates the partitions to stripes S according to one of the randomizing or consistent hashing procedures described above with respect to FIG. 2, FIG. 3, or FIG. 8. The allocation typically generates an allocation table, similar to table I, having a first column as the partition number, and last columns as the stripe number and corresponding device number. The allocation table thus gives a relationship between each partition number and its stripe number, and is stored as a look-up table 43 in memory 28, for use by processor 26 in accessing the partitions. Table VII below illustrates generation of table 43. Alternatively or additionally, a procedure 45 using a consistent hashing function, similar to the consistent hashing functions described above, is stored in memory 28, for use generate the relationship In a third step 166, processor 26 stores the partitions to stripes, according to the relationship of step 164.

If a device is added to system 118, in a fourth step 168, processor 26 reallocates partitions stored in existing devices to stripes of the added device. The reallocation is performed in a generally similar manner, mutatis mutandis, to the method described above with respect to FIG. 5. In a fifth step 170, reallocated partitions are stored to the stripes of the added device.

If a device is removed from system 118, in a sixth step 172 processor 26 reallocates partitions stored in the removed device to stripes of the remaining devices. The reallocation is performed in a generally similar manner, mutatis mutandis, to the method described above with respect to FIG. 4. In a seventh step 174, reallocated partitions are stored to the stripes of the remaining devices, in accordance with the reallocation determined in step 172.

After step 170 or 174, flowchart 160 ends.

Table VII below illustrates generation of table 43 for data D corresponding to one set 120 of data (FIG. 10). Table VII assumes that partitions P are stored to 100 stripes 36, referred to herein as stripes S1, S2, . . . , S100, and the stripes have been evenly pre-allocated to five devices $B_1$, . . . $B_5$. A random number between 1 and 100 is used to allocate a partition to a stripe.

TABLE VII

| Partition | Random Number | Stripe | Device |
|---|---|---|---|
| P1 | 12 | S12 | B1 |
| P2 | 32 | S32 | B2 |
| ... | ... | ... | |
| P500 | 36 | S36 | B2 |
| P501 | 79 | S79 | B4 |
| P502 | 2 | S2 | B1 |
| P503 | 32 | S32 | B2 |
| ... | ... | ... | |
| P995 | 5 | S5 | B1 |
| P996 | 84 | S84 | B5 |
| P997 | 5 | S5 | B1 |
| P998 | 93 | S93 | B5 |
| P999 | 44 | S44 | B3 |
| P1000 | 3 | S3 | B1 |

Table VII illustrates a relationship between partitions and stripes for a single set of data, using a random number generator. Those skilled in the art will be able to adapt the procedures described herein for generating table VII using a consistent hashing function, and/or in the case of data D comprising more than one data-set.

Figure 14:
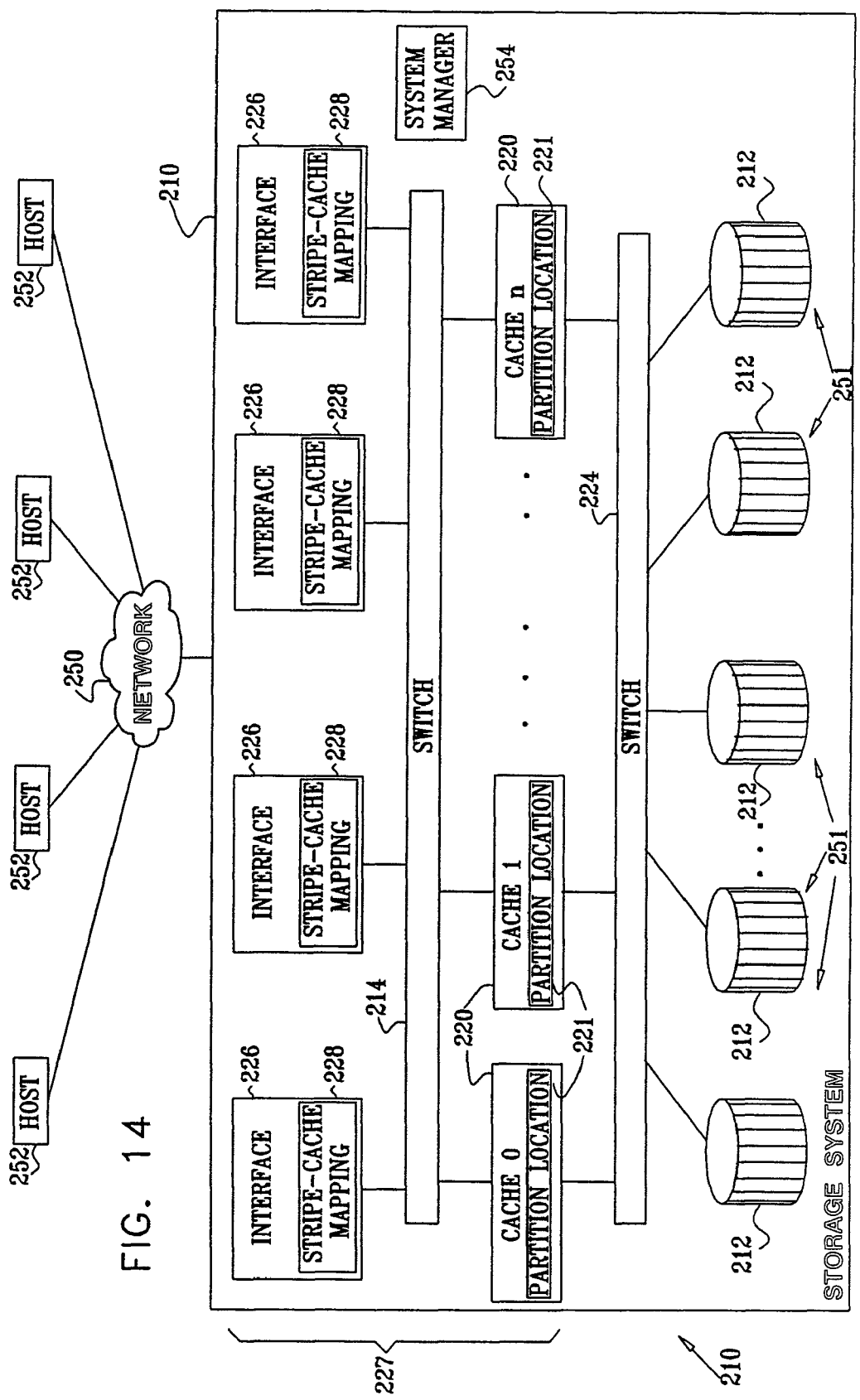
FIG. 14 is a schematic block diagram of an alternative storage system, according to an embodiment of the present invention.

FIG. 14 is a schematic block diagram of an alternative storage system 210, according to an embodiment of the present invention. System 210 acts as a data memory for one or more host processors 252, which are coupled to the storage system by any means known in the art, for example, via a network such as the Internet or by a bus. Herein, by way of example, hosts 252 and system 210 are assumed to be coupled by a network 250. The data stored within system 210 is stored at stripes 251 in one or more slow access time mass storage devices, hereinbelow assumed to be one or more disks 212, by way of example. The data is typically stored and accessed as partitions of data-sets. A system manager 254 acts as a control unit for the system. It will be appreciated that manager 254 may comprise one or more processing units, and that some or all of the processing units may be centralized or distributed in substantially any suitable locations, such as within elements of system 210 and/or hosts 252.

System 210 comprises one or more substantially similar interfaces 226 which receive input/output (IO) access requests for data in disks 212 from hosts 252. Each interface 226 may be implemented in hardware and/or software, and may be located in storage system 210 or alternatively in any other suitable location, such as an element of network 250 or one of host processors 252. Between disks 212 and the interfaces are a plurality of interim devices, also termed herein interim caches 220, each cache 220 comprising memory having fast access time, and each cache being at an equal level hierarchically. Each cache 220 typically comprises random access memory (RAM), such as dynamic RAM, and may also comprise software. Caches 220 are coupled to interfaces 226 by any suitable fast coupling system known in the art, such as a bus or a switch, so that each interface is able to communicate with, and transfer data to and from, any cache. Herein the coupling between caches 220 and interfaces 226 is assumed, by way of example, to be by a first cross-point switch 214. Interfaces 226 operate substantially independently of each other. Caches 220 and interfaces 226 operate as a data-set transfer system 227, transferring data-sets and/or partitions of data-sets between hosts 252 and disks 212.

Caches 220 are typically coupled to disks 212 by a fast coupling system. The coupling between the caches and the disks may be by a "second plurality of caches to first plurality of disks" coupling, herein termed an "all-to-all" coupling, such as a second cross-point switch 224. Alternatively, one or more subsets of the caches may be coupled to one or more subsets of the disks. Further alternatively, the coupling may be by a "one-cache-to-one-disk" coupling, herein termed a "one-to-one" coupling, so that one cache communicates with one disk. The coupling may also be configured as a combination of any of these types of coupling. Disks 212 operate substantially independently of each other.

At setup of system 210 system manager 254 assigns a range of stripes to each cache 220. Manager 254 may subsequently reassign the ranges during operation of system, and an example of steps to be taken in the event of a cache change is described in application Ser. No. 10/620,249. The ranges are chosen so that the complete memory address space of disks 212 is covered, and so that each stripe is mapped to at least one cache; typically more than one is used for redundancy purposes. The assigned ranges for each cache 220 are typically stored in each interface 226 as a substantially similar table, and the table is used by the interfaces in routing IO requests from hosts 252 to the caches. Alternatively or additionally, the assigned ranges for each cache 220 are stored in each interface 226 as a substantially similar function, such as the function exemplified by equations (1) above. Further alternatively, any other suitable method known in the art for generating a correspondence between ranges and caches may be incorporated into interfaces 226. Hereinbelow, the correspondence between caches and ranges is referred to as stripe-cache mapping 228, and it will be understood that mapping 228 gives each interface 226 a general overview of the complete cache address space of system 210.

In system 210, each cache 220 contains a partition location table 221 specific to the cache. Each partition location table 221 gives its respective cache exact location details, on disks 212, for partitions of the range of stripes assigned to the cache. Partition location table 221 may be implemented as software, hardware, or a combination of software and hardware. The operations of a table similar to partition location table 221, and also of a mapping similar to mapping 228, are explained in more detail in application Ser. No. 10/620,249.

FIG. 15 is a flow chart showing steps followed by system 210 on receipt of an IO request from one of hosts 252, according to an embodiment of the present invention. Each IO request from a specific host 252 comprises several parameters, such as whether the request is a read or a write command, and which partitions and/or data-sets are included in the request.

In an initial step 300, the IO request is transmitted to system 210 according to a protocol under which the hosts and the system are operating. The request is received by system 210 at one of interfaces 226, herein, for clarity, termed the request-receiving interface (RRI) interface.

In a stripe identification step 302, the RRI interface identifies from the request which partitions and/or data-sets are to be read, or which partitions and/or data-sets are to be written to. The RRI interface then determines the stripes corresponding to the identified partitions and/or data-sets.

In a cache identification step 304, the RRI interface refers to its mapping 228 to determine the caches corresponding to stripes determined in the step 302. For each stripe so determined, the RRI interface transfers a respective partition and/or data-set request to the corresponding cache. It will be understood that each partition and/or data-set request is a read or a write command, according to the originating IO request.

In a cache response step 306, each cache 220 receiving a partition and/or data-set request from the RRI interface responds to the request. The response is a function of, inter alia, the type of request, i.e., whether the request is a read or a write command and whether the request is a "hit" or a "miss." Thus, a partition and/or data-set may be written to one or more disks 212 from the cache and/or read from one or more disks 212 to the cache. A partition and/or data-set may also be written to the RRI from the cache and/or read from the RRI to the cache. If the response includes writing to or reading from a disk 212, the cache uses its partition location table 221 to determine the location on the corresponding disk of the partition and/or data-set.

As stated in the Background of the Invention, there are a number of different types of data storage system known in the art, the systems differing, inter alia, in the basic unit of storage that is used. For example, SAN systems use logical units (LUs), and NAS systems use files. It will be appreciated that embodiments of the present invention may be used substantially regardless of the type of storage system that is implemented. For example, referring back to FIG. 11, sets of data F1, F2, F3, . . . may comprise sets of files, or sets of file meta-data, so that system 118 may operate within a NAS system. Alternatively, sets of data F1, F2, F3, . . . may comprise sets of storage objects, so that system 118 may operate within an OSA system or within a CAS system. Furthermore, sets of data F1, F2, F3, . . . may comprise other classifications of data known in the art, such as data comprising a data packet, a video tape, a music track, an image, a database record, contents of a logical unit, and/or an email.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

We claim:

1. A method for storing data, comprising:
distributing a first plurality of groups of logical addresses among one or more storage devices;
receiving a second plurality of data-sets containing the data to be stored;
assigning each data-set among the plurality of data-sets a number chosen from a first plurality of different numbers;
partitioning each data-set into multiple partitions, so that each partition among the multiple partitions receives a sequential partition number;
assigning each partition within each data-set to be stored at a specific group of logical addresses in accordance with the sequential partition number of the partition and the number assigned to the data-set; and
storing each partition at the assigned specific group of logical addresses; wherein:
the first plurality of groups comprises s groups, each having a different integral group number between 1 and s,
the number comprises an integer r randomly chosen from and including integers between 0 and s−1,
the sequential partition number comprises a positive integer p, and
the group number of the assigned specific group is (r+p) modulo(s) if (r+p)modulo(s)≠0, and s if (r+p)modulo(s)=0.

2. The method according to claim 1, wherein the multiple partitions comprise equal size partitions.

3. The method according to claim 1, wherein the data-sets comprise data from at least one of a file, file meta-data, a storage object, a data packet, a video tape, a music track, an image, a database record, contents of a logical unit, and an email.

4. The method according to claim 1, wherein the one or more storage devices are operative in at least one of a storage area network, a network attached storage system, and an object storage architecture.

5. The method according to claim 1, wherein the number is chosen by a randomizing function.

6. The method according to claim 1, wherein the number is chosen by a consistent hashing function.

7. A data storage system, comprising:
one or more mass-storage devices, coupled to store partitions of data at respective first ranges of logical addresses (LAs);
a plurality of interim devices, configured to operate independently of one another, each interim device being assigned a respective second range of the LAs and coupled to receive the partitions of data from and provide the partitions of data to the one or more mass-storage devices having LAs within the respective second range; and
one or more interfaces, which are adapted to receive input/output (IO) requests from host processors, to identify specified partitions of data in response to the IO requests, to convert the IO requests to converted-IO-requests directed to specified LAs in response to the specified partitions of data, and to direct all the converted-IO-requests to the interim device to which the specified LAs are assigned.

8. The storage system according to claim 7, wherein at least one of the mass-storage devices has a slow access time, and wherein at least one of the interim devices has a fast access time.

9. The storage system according to claim 7, wherein the one or more mass-storage devices are coupled to provide a balanced access to the first ranges of LAs.

10. The storage system according to claim 7, wherein the storage system is operative in at least one of a storage area network, a network attached storage system, and an object storage architecture.

11. The data storage system according to claim 7, wherein the one or more interfaces are further adapted to receive at least part of a data-set containing the data.

12. The data storage system according to claim 11, wherein the data-set comprises data from at least one of a file, file meta-data, a storage object, a data packet, a video tape, a music track, an image, a database record, contents of a logical unit, and an email.

13. A data storage system, comprising:
one or more storage devices wherein are distributed a first plurality of groups of logical addresses; and
a processing unit which is adapted to:
receive a second plurality of data-sets containing the data to be stored, assign each data-set among the plurality of data-sets a number chosen from a first plurality of different numbers,
partition each data-set into multiple partitions, so that each partition among the multiple partitions receives a sequential partition number,
assign each partition within each data-set to be stored at a specific group of logical addresses in the one or more storage devices in accordance with the sequential partition number of the partition and the number assigned to the data-set, and
store each partition in the one or more storage devices at the assigned specific group of logical addresses; wherein:
the first plurality of groups comprises s groups each having a different integral group number between 1 and s,
the number comprises an integer r randomly chosen from and including integers between 0 and s−1,
the sequential partition number comprises a positive integer p, and
the group number of the assigned specific group is (r+p) modulo(s) if (r+p)modulo(s)≠0, and s if (r+p)modulo(s)=0.

14. The data storage system according to claim 13, wherein the multiple partitions comprise equal size partitions.

15. The data storage system according to claim 13, wherein the data-sets comprise data from at least one of a file, file meta-data, a storage object, a data packet, a video tape, a music track, an image, a database record, contents of a logical unit, and an email.

16. The data storage system according to claim 13, wherein the one or more storage devices and the processing unit are operative in at least one of a storage area network, a network attached storage system, and an object storage architecture.

17. The data storage system according to claim 13, wherein the number is chosen by a randomizing function.

18. The data storage system according to claim 13, wherein the number is chosen by a consistent hashing function.

19. The data storage system according to claim 13, wherein each data-set comprises data from at least one of a file, file meta-data, a storage object, a data packet, a video tape, a music track, an image, a database record, contents of a logical unit, and an email.

20. A method for storing data, comprising:
coupling one or more mass-storage devices to store partitions of data at respective first ranges of logical addresses (LAs);
configuring a plurality of interim devices to operate independently of one another;
assigning each interim device a respective second range of the LAs;
coupling each interim device to receive the partitions of data from and provide the partitions of data to the one or more mass-storage devices having LAs within the respective second range;
receiving input/output (IO) requests from host processors;
identifying specified partitions of data in response to the IO requests;
converting the IO requests to converted-IO-requests directed to specified LAs in response to the specified partitions of data; and
directing all the converted-IO-requests to the interim device to which the specified LAs are assigned.

21. The method according to claim 20, wherein at least one of the mass-storage devices has a slow access time, and wherein at least one of the interim devices has a fast access time.

22. The method according to claim 20, wherein the one or more mass-storage devices are coupled to provide a balanced access to the first ranges of LAs.

23. The method according to claim 20, wherein the one or more storage devices and the plurality of interim devices are operative in at least one of a storage area network, a network attached storage system, and an object storage architecture.

* * * * *